United States Patent
Haque et al.

(10) Patent No.: US 10,988,681 B2
(45) Date of Patent: Apr. 27, 2021

(54) NANOCOMPOSITE COATED PROPPANTS AND METHODS OF MAKING AND USE THEREOF

(71) Applicant: Saudi Arabian Oil Company, Dhahran (SA)

(72) Inventors: Mohammad Hamidul Haque, Katy, TX (US); Rajesh Kumar Saini, Cypress, TX (US); Mohammed Sayed, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/410,563

(22) Filed: May 13, 2019

(65) Prior Publication Data

US 2019/0345377 A1 Nov. 14, 2019

Related U.S. Application Data

(60) Provisional application No. 62/795,110, filed on Jan. 22, 2019, provisional application No. 62/671,183, filed on May 14, 2018.

(51) Int. Cl.
| | |
|---|---|
| *C08K 3/04* | (2006.01) |
| *B82Y 30/00* | (2011.01) |

(Continued)

(52) U.S. Cl.
CPC .............. *C09K 8/805* (2013.01); *B82Y 30/00* (2013.01); *C04B 41/0072* (2013.01);

(Continued)

(58) Field of Classification Search
None
See application file for complete search history.

(56) References Cited

U.S. PATENT DOCUMENTS

| | | | |
|---|---|---|---|
| 5,639,806 A | * | 6/1997 | Johnson ................ B22C 1/2233 523/208 |
| 7,032,664 B2 | | 4/2006 | Lord et al. |

(Continued)

FOREIGN PATENT DOCUMENTS

| | | |
|---|---|---|
| WO | 2008018966 A2 | 2/2008 |
| WO | 2014204517 A2 | 12/2014 |
| WO | WO-2014204517 A2 * | 12/2014 ............... C09K 8/70 |

OTHER PUBLICATIONS

Zhang et al., "Synergistic effect of carbon nanotube and graphene nanoplates on the mechanical, electrical and electromagnetic interference shielding properties of polymer composites and polymer composite foams", Chemical Engineering Journal, 2018, 26 pgs.

(Continued)

*Primary Examiner* — Charles R Nold
(74) *Attorney, Agent, or Firm* — Dinsmore & Shohl

(57) ABSTRACT

Methods for producing proppants with a nanocomposite proppant coating are provided. The methods include coating the proppant particles with a nano-reinforcing agent, a surface modifier, and a resin to produce proppants with nanocomposite proppant coating. Additionally, a proppant comprising a proppant particle and a nanocomposite proppant coating is provided. The nanocomposite proppant coating includes a nano-reinforcing agent, a surface modifier, and a resin. The nanocomposite proppant coating coats the proppant particle. Additionally, a method for increasing a rate of hydrocarbon production from a subsurface formation through the use of the proppants is provided.

15 Claims, 17 Drawing Sheets

(51) Int. Cl.
- *C09K 8/80* (2006.01)
- *C09K 8/05* (2006.01)
- *E21B 43/267* (2006.01)
- *C04B 41/00* (2006.01)
- *C04B 41/45* (2006.01)
- *C04B 41/48* (2006.01)

(52) U.S. Cl.
CPC ...... *C04B 41/4558* (2013.01); *C04B 41/4584* (2013.01); *C04B 41/4823* (2013.01); *C04B 41/4853* (2013.01); *C04B 41/4884* (2013.01); *C08K 3/041* (2017.05); *C09K 8/05* (2013.01); *C09K 8/80* (2013.01); *E21B 43/267* (2013.01); *B05D 2503/00* (2013.01); *B05D 2504/00* (2013.01); *C08K 2201/011* (2013.01); *C08K 2201/013* (2013.01)

(56) References Cited

U.S. PATENT DOCUMENTS

| | | | |
|---|---|---|---|
| 7,803,742 B2 | 9/2010 | Bicerano et al. | |
| 8,236,737 B2 | 8/2012 | Fan et al. | |
| 8,852,682 B2 | 10/2014 | Sinclair et al. | |
| 8,931,553 B2 | 1/2015 | Cannan et al. | |
| 8,993,489 B2 | 3/2015 | McDaniel et al. | |
| 9,045,678 B2 | 6/2015 | Rediger | |
| 9,434,874 B2 | 9/2016 | Qin et al. | |
| 9,725,645 B2 | 8/2017 | Monastiriotis et al. | |
| 10,017,688 B1* | 7/2018 | Green .................. | C09K 8/805 |
| 2007/0036977 A1 | 2/2007 | Sinclair et al. | |
| 2009/0288820 A1 | 11/2009 | Barron et al. | |
| 2014/0162911 A1 | 6/2014 | Monastiriotis et al. | |
| 2016/0347985 A1 | 12/2016 | Li et al. | |
| 2017/0247608 A1* | 8/2017 | Raysoni ................ | C09K 8/805 |
| 2018/0230370 A1 | 8/2018 | Johnson et al. | |

OTHER PUBLICATIONS

International Search Report and Written Opinion dated Jul. 19, 2019, pertaining to International Application Na PCT/US2019/031648 filed May 10, 2019, 13 pgs.

Examination Report dated Jun. 2, 2020 pertaining to GCC Patent Application No. 2019-37563.

* cited by examiner

NANOCOMPOSITE COATED PROPPANTS AND METHODS OF MAKING AND USE THEREOF

CROSS-REFERENCE TO RELATED APPLICATIONS

This application claims the benefit of U.S. Provisional Application Ser. No. 62/795,110 filed Jan. 22, 2019, and 62/671,183 filed May 14, 2018.

TECHNICAL FIELD

Embodiments of the present disclosure generally relate to coated proppant systems.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand of a particular size, may be mixed with the treatment fluid to keep the fracture open when the treatment is complete.

SUMMARY

It is often desirable during and after fracturing a subsurface formation to hold the fractures open through the use of proppants for more effective oil and gas production than without. However, sand particles, which are used as a proppant, may not provide sufficient crush resistance for use in a given subsurface formation due to the polycrystalline nature of the grains. Conventional uncoated proppant break under downhole stress. Ceramic proppants break down in wet conditions, which cause them to lose their crush resistance. Temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a greater area of the coated proppant particle. In turn, the distribution of force along a greater area should result in a decrease in the amount of crushed proppant particles, also known as 'the crush percentage.' The proppant coating also adheres to the proppant and prevents proppant that is crushed from releasing proppant fines. Proppant fines may migrate into the formation and restrict flow conductivity of the formation.

Accordingly, a need exists for a strong, chemically-resistant proppant coating. Using resin in the proppant coating prevents crushing, fines migration, proppant flowback and breakdown of the proppant particle. The dispersion of strengthening agents enhances the mechanical strength of the coating materials. The dispersion of strengthening agents further provide resistance to the chemicals present in hydraulic fracturing fluid.

According to the subject matter of the present disclosure, a method for producing proppants with a nanocomposite proppant coating is disclosed. The method includes coating the proppant particles with a nano-reinforcing agent, a surface modifier, and a resin to produce proppants with nanocomposite proppant coating.

In accordance with another embodiment of the present disclosure, a proppant composed of a proppant particle and a nanocomposite proppant coating is disclosed. The nanocomposite proppant coating includes a nano-reinforcing agent, a surface modifier, and a resin. The nanocomposite proppant coating coats the proppant particle.

In accordance with another embodiment of the present disclosure, a method for increasing a rate of hydrocarbon production from a subsurface formation is disclosed. The method includes producing a first rate of production of hydrocarbons from the subsurface formation, in which the hydrocarbons comprise a first interfacial tension; introducing a hydraulic fracturing fluid comprising proppants into the subsurface formation, in which the proppants reduce the first interfacial tension of the hydrocarbons to a second interfacial tension, thereby reducing condensate banking or water blockage near a wellbore; and increasing hydrocarbon production from the subsurface formation by producing a second rate of production of hydrocarbons from the subsurface formation, in which the second rate of production of hydrocarbons is greater than the first rate of production of hydrocarbons.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
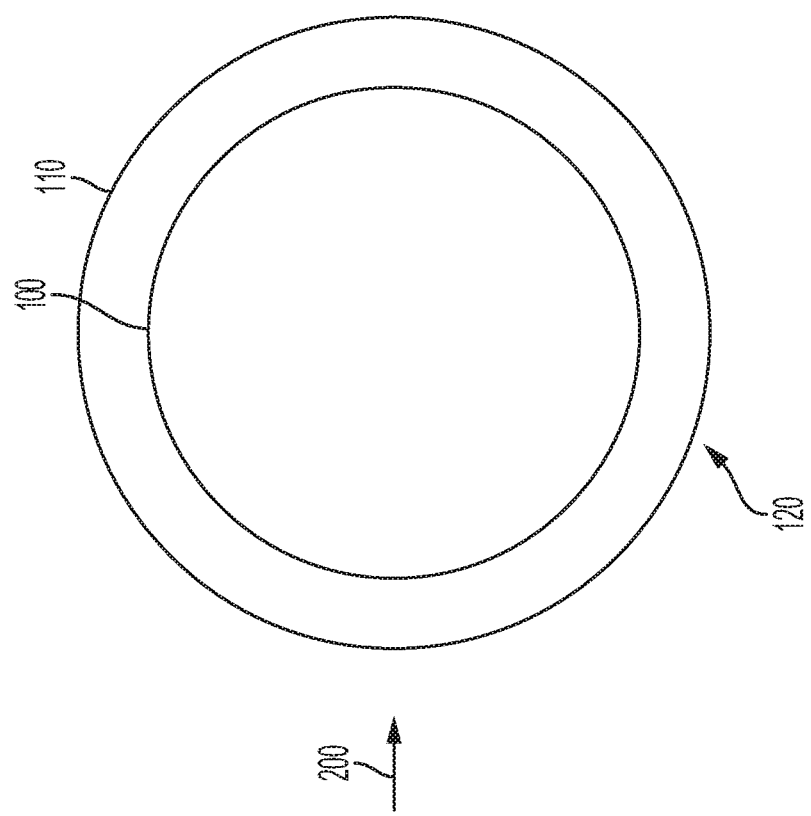
FIG. 1 is a schematic view of a proppant particle and a nanocomposite coated proppant, according to one or more embodiments described in this disclosure.
Figure 1:
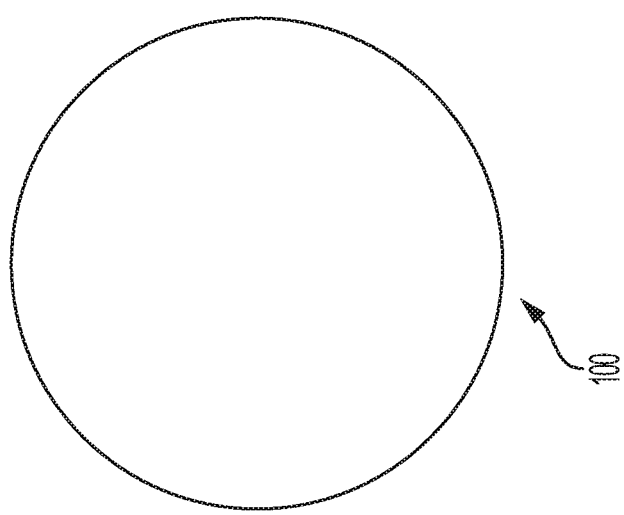

As used throughout this disclosure, the term "condensate" refers to a liquid hydrocarbon that generally occurs in association with natural gas. Its presence as a liquid phase depends on temperature and pressure conditions in the reservoir allowing condensation of liquid from vapor. The production of condensate reservoirs can be complicated because of the pressure sensitivity of some condensates. During production, there is a risk of the condensate changing from gas to liquid if the reservoir pressure is reduced to less than the dew point during production. Hydrocarbon gas produced in association with condensate is called wet gas. The API gravity of condensate is typically 50° to 120°.

As used throughout this disclosure, the term "condensate banking" refers to a relative permeability effect where condensate is reduced out of the vapor phase around the wellbore when the pressure is reduced to less than the dew point in response to drawdown or depletion. Gas production rate may be hindered by the permeability reduction.

As used throughout this disclosure, the term "hydraulic fracturing" refers to a stimulation treatment routinely performed on hydrocarbon wells. Hydraulic fracturing fluids are pumped into a subsurface formation, causing a fracture to form or open. The wings of the fracture extend away from the wellbore in opposing directions according to the natural stresses within the subsurface formation. Proppants are mixed with the treatment fluid to keep the fracture open when the treatment is complete. Hydraulic fracturing creates fluid communication with a subsurface formation and bypasses damage, such as condensate banking, that may exist in the near-wellbore area.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppant" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "reservoir" refers to a subsurface formation having sufficient porosity and permeability to store and transmit fluids.

As used throughout this disclosure, the term "wellbore" refers to the drilled hole or borehole, including the openhole or uncased portion of the well. Borehole may refer to the inside diameter of the wellbore wall, which is the rock face that bounds the drilled hole.

To produce hydrocarbons from a hydrocarbon-containing reservoir, production wells are drilled to a depth that enables hydrocarbons to travel from the subsurface formation to the surface. However, when producing hydrocarbon gas, the wellbore and subsurface formation pressure decrease as the volume of hydrocarbon gas in the reservoir decreases. If pressure is reduced to less than the dew point of the hydrocarbon gas, condensate may form and create blockage, decreasing the permeability between the wellbore and the subsurface formation, and thereby decreasing the rate of production of the hydrocarbon gas.

The present disclosure is directed to compositions and methods for producing proppants with a nanocomposite proppant coating, and to methods for increasing a rate of hydrocarbon production from a subsurface formation through the use of proppants with a nanocomposite proppant coating. The proppant comprises a proppant particle and a nanocomposite proppant coating. The nanocomposite proppant coating includes a nano-reinforcing agent, a surface modifier, and a resin. The nanocomposite proppant coating coats the proppant particle. The nano-reinforcing agent, the surface modifier, and the resin may be uniformly distributed throughout the nanocomposite proppant coating. In other embodiments, the nanocomposite proppant coating may include the resin as a separate layer from the nano-reinforcing agent combined with the surface modifier, such as the nano-reinforcing agent and the surface modifier coated as a layer over the resin. These layers may be of uniform thickness or may comprise changes in thickness throughout, leading to hierarchical roughness in the nanocomposite proppant coating.

As previously disclosed, the nano-reinforcing agent enhances the mechanical strength of the nanocomposite proppant coating and provides resistance to chemicals used in hydraulic fracturing fluid. Among other benefits, the surface modifier imparts gas wetting characteristics to the nanocomposite proppant coating. This reduces the interfacial tension and prevents condensate or water blockage in the wellbore, increasing gas relative permeability and thereby reducing condensate banking. The surface modifier may also impart hydrophobic or oleophobic characteristics to the proppant, such that water will not wet the surface, which decreases the degradation of the proppants due to contact with water. These wettability characteristics enhance the load recovery of hydraulic fracturing fluid or water after fracturing operation as the hydrocarbons will experience less friction from contact with the proppant. This increases the rate of hydrocarbon production and the overall amount of hydrocarbon production.

FIG. 1 schematically portrays two states of a proppant particle 100. On the left, a proppant particle 100 is depicted in a first, uncoated state. Then, on the right, a nanocomposite coated proppant is depicted in which the proppant particle 100 is in a second, coated state. In the second state, the proppant particle 100 has undergone a coating step 200 to be coated with a nanocomposite proppant coating 110, forming a nanocomposite coated proppant 120.

The proppant particle may be chosen from any type of proppant suitable for use in hydraulic fracturing applications. As previously described, proppants are propping agent particles used in hydraulic fracturing fluids to maintain and hold open subsurface fractures during or following subsurface treatment. In some embodiments, the proppant particle may comprise particles of materials such as inorganic oxides, silicates, sand, alumina, bauxite, silica, ceramic, thermoset resins, resin, epoxy, plastic, mineral, glass, silicon carbide, silicon nitride, zirconia, walnut hulls, composites of resin and other minerals or combinations of these. For instance, the proppant particle may comprise graded sand, treated sand, ceramic, or plastic. The proppant particle may comprise particles of bauxite, sintered bauxite, Ti4+/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials.

The material of the proppant particle may be chosen based on the particular application and characteristics desired, such as the depth of the subsurface formation in which the proppant particles will be used, as proppant particles with a greater mechanical strength are needed at greater lithostatic pressures. For instance, ceramic proppant materials exhibit greater strength, thermal resistance, and conductivity than sands. Fully (pre-cured) or partially cured (curable) resin-coated sand may be chosen in embodiments to provide sand particles of irregular size and shape with greater crush resistance strength and conductivity.

The proppant particle may include various sizes or shapes. In some embodiments, the one or more proppant particles may have sizes from 8 mesh to 140 mesh (diameters from 105 micrometers (μm) to 2380 μm). In some embodiments, the proppant particles may have sizes from 8 mesh to 16 mesh (diam. 2380 μm to 1180 μm), 16 mesh to 30 mesh (diam. 600 μm to 1190 μm), 20 mesh to 40 mesh (diam. 420 μm to 840 μm), 30 mesh to 50 mesh (diam. 300 μm to 595 μm), 40 mesh to 70 mesh (diam. 210 μm to 420 μm) or 70 mesh to 140 mesh (diam. 105 μm to 210 μm).

In some embodiments, the proppant particles may have a rough surface texture that may increase adhesion of the nanocomposite proppant coating to the proppant particle. The proppant particle surfaces may be roughened to increase the surface area of the proppant particle by any suitable physical or chemical method, including, for example, using an appropriate etchant. In some embodiments, the proppant particle may have a surface that provides adherence of the nanocomposite proppant coating to the proppant particle. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, or projections. The rough surface may have an arithmetic average roughness ($R_a$) of greater than or equal to 1 nanometer (nm) (1 nm=0.001 micron (μm)). $R_a$ is defined as the arithmetic average of the differences between the local surface heights and the average surface height and can be described by Equation 1, contemplating n measurements:

$$R_a = \frac{1}{n}\sum_{i=1}^{n} |y_i| \qquad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

As previously discussed in this disclosure, the nanocomposite proppant coating comprises a nano-reinforcing agent, a surface modifier, and a resin. In some embodiments, the nano-reinforcing agent may include graphene and carbon nanotubes.

The graphene may increase the strength of the proppant coating, increase the conductivity of the proppants, or both. The graphene can be provided in any desirable form or combination of forms, for example, sheets, platelets, fibers, chemically-modified graphene, doped graphene, functionalized graphene, grossly warped nanographene, or combinations of these. In some embodiments, the graphene includes graphene oxide, graphite, or combinations of these. Graphene or derivatives of these can be combined with one or more other types of carbon molecules such as diamonds, graphite nanotubes, fullerenes, or combinations of these. Graphene can be produced using any suitable procedure such as exfoliation, epitaxial growth, chemical vapor deposition, electrostatic force, reduction of graphene oxide or carbon dioxide, sonication, nanotube excision, metal-carbon melts, spark plasma sintering, pyrolysis, or any combination of these.

The carbon nanotubes include at least one of single-walled nanotubes, double-walled nanotubes, multi-walled carbon nanotubes, or narrow-walled nanotubes. The carbon nanotubes include a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes include a length of from 20 to 500 μm, 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm.

The carbon nanotubes include an aspect ratio of from 100 to 100,000, from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000. As used throughout this disclosure, the term "aspect ratio" refers to a ratio of width to length.

The carbon nanotubes include a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The multi-walled carbon nanotubes include a bulk density of from 0.001 to 1 grams per cubic centimeter ($g/cm^3$), from 0.001 to 0.12 $g/cm^3$, from 0.01 to 0.08 $g/cm^3$, from 0.02 to 0.06 $g/cm^3$, from 0.01 to 1 $g/cm^3$, from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

The nanocomposite proppant coating may include less than or equal to 5 weight percent (wt. %), 2 wt. %, 1.5 wt. %, 1 wt. %, 0.75 wt. %, 0.5 wt. %, 0.2 wt. %, or 0.1 wt. % of the nano-reinforcing agent. The proppants may comprise from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % nano-reinforcing agent as calculated by a weight of the resin.

As non-limiting examples, the nano-reinforcing agent may include ceramic materials, metallic materials, organic materials, inorganic materials, mineral-based materials or any combination of these. In some embodiments, the nano-reinforcing agent comprises at least one of nano-silica, nano-alumina, nano-zinc oxide, carbon nanotubes, nano-calcium carbonate, mica, vanadium pentoxide, boron nitride nanotubes, or nano-zirconium oxide.

Ceramic materials include, but are not limited to, alumina, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or any combination of these.

Metallic materials include, but are not limited to, iron, nickel, chromium, silicon, aluminum, copper, cobalt, beryllium, tungsten, molybdenum, titanium, magnesium, silver, as well as alloys of metals, and the like, or any combination of these. Metallic materials may also include the family of intermetallic materials, such as iron aluminides, nickel aluminides, and titanium aluminides.

Organic materials include, but are not limited to, carbon-based structures such as carbon nanotubes, single walled carbon nanotubes (SWNT), double walled nanotubes (DWNT), multi-walled carbon nanotubes (MWNT), armchair nanotubes, zig-zag nanotubes, helical nanotubes, bundles of single wall nanotubes, bundles of multi-wall nanotubes, nanofibers, nanorods, nanowires, nanospheres, microspheres, whiskers of oxide, fullerenes, graphene, carbon fibers, graphite fibers, nomex fibers, or combinations of these.

Inorganic materials include, vanadium pentoxide nanotubes, boron-nitride nanotube, tungsten, disulfidezinc oxide, diamond, clay, boron, boron nitride, silver, titanium dioxide, carbon, molybdenum disulfide, γ-aluminium oxide, titanium, palladium, tungsten disulfide, silicon dioxide, graphite, zirconium(IV) oxide-yttria stabilized, carbon, gd-doped-cerium(IV) oxide, nickel cobalt oxide, nickel(II) oxide, rhodium, sm-doped-cerium(IV) oxide, barium strontium titanate and silver.

Mineral-based particulates include, but are not limited to, such materials as kyanite, mica, quartz, sapphire, corundum, aluminosilicate minerals, and combinations of these.

As previously discussed in this disclosure, the nanocomposite proppant coating also includes a surface modifier. Surface modifiers provide a formulation with adequate wetting properties, enhance different component compatibility or improve the appearance of a coating surface. The surface modifier may comprise at least one of an alkyl fluorosilane solution, a fluorinated surfactant, a fluorinated polymer, and a fluorinated polymeric surfactant. The alkyl fluorosilane solution may comprise triethoxy(tridecafluorooctyl)silane. The alkyl fluorosilane solution functions as a surface modifier and may comprise from 1 volume percent (vol. %) to 10 vol. %, from 1 vol. % to 8 vol. %, from 1 vol. % to 6 vol. %, from 1 vol. % to 4 vol. %, from 1 vol. % to 3 vol. %, from 1 vol. % to 2 vol. %, from 2 vol. % to 10 vol. %, from 2 vol. % to 8 vol. %, from 2 vol. % to 6 vol. %, from 2 vol. % to 4 vol. %, from 2 vol. % to 3 vol. %, from 3 vol. % to 10 vol. %, from 3 vol. % to 8 vol. %, from 3 vol. % to 6 vol. %, from 3 vol. % to 4 vol. %, from 4 vol. % to 10 vol. %, from 4 vol. % to 8 vol. %, from 4 vol. % to 6 vol. %, from 6 vol. % to 10 vol. %, from 6 vol. % to 8 vol. %, or from 8 vol. % to 10 vol. % triethoxy(tridecafluorooctyl)silane. The surface modifier may comprise from 90% to 99% propanol. The surface modifier may comprise a pH of less than 7, 6, 5, 4, 3, 2, or 1; a boiling point of from 70° C. to 90° C., from 75° C. to 85° C., or of 82° C.; a flash point of less than 50° C., 40° C., 30° C., 25° C., 22° C., 20° C., 15° C., or 10° C.; a viscosity of from 1 to 10 milliPascal seconds (mPa·s), from 1 to 5 mPa·s, from 1 to 4 mPa·s, from 1 to 2 mPa·s, from 2 to 4 mPa·s, from 2 to 5 mPa·s, from 2 to 10 mPa·s, from 4 to 5 mPa·s, from 4 to 10 mPa·s, from 5 to 10 mPa·s, or of 2 mPa·s; and a density of from 0.5 to 1.5 g/cm$^3$, 0.7 to 1 g/cm$^3$, or of 0.8 g/cm$^3$. The surface modifier comprises a surface energy of less than 50 milliJoules per square meter (mJ/m$^2$), less than 40 mJ/m$^2$, less than 38 mJ/m$^2$, less than 37 mJ/m$^2$, less than 36 mJ/m$^2$, less than 35 mJ/m$^2$, less than 33 mJ/m$^2$, less than 31 mJ/m$^2$, less than 30 mJ/m$^2$, less than 29 mJ/m$^2$, less than 25 mJ/m$^2$, less than 20 mJ/m$^2$, less than 18 mJ/m$^2$, less than 15 mJ/m$^2$, less than 10 mJ/m$^2$, or less than 5 mJ/m$^2$.

In some embodiments, the nanocomposite proppant coating may include a polymer. The polymer may include resin, polyester, urea aldehyde, polyurethane, vinyl esters, furfural alcohol or any combination of these. Resin is a substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. The resin may comprise phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin, vinyl ester resin, or combinations of these. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The novolac polymer comprises a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol.

The proppants may include from 0.5 to 20 wt. %, from 0.5 to 15 wt. %, from 0.5 to 10 wt. %, from 0.5 to 8 wt. %, from 0.5 to 6 wt. %, from 0.5 to 5 wt. %, from 0.5 to 4.5 wt. %, from 0.5 to 2 wt. %, from 0.5 to 1 wt. %, 1 to 20 wt. %, from 1 to 15 wt. %, from 1 to 10 wt. %, from 1 to 8 wt. %, from 1 to 6 wt. %, from 1 to 5 wt. %, from 1 to 4.5 wt. %, from 1 to 2 wt. %, 2 to 20 wt. %, from 2 to 15 wt. %, from 2 to 10 wt. %, from 2 to 8 wt. %, from 2 to 6 wt. %, from 2 to 5 wt. %, from 2 to 4.5 wt. %, 1 to 2 wt. %, 4.5 to 20 wt. %, from 4.5 to 15 wt. %, from 4.5 to 10 wt. %, from 4.5 to 8 wt. %, from 4.5 to 6 wt. %, from 4.5 to 5 wt. %, 5 to 20 wt. %, from 5 to 15 wt. %, from 5 to 10 wt. %, from 5 to 8 wt. %, from 5 to 6 wt. %, 8 to 20 wt. %, from 8 to 15 wt. %, from 8 to 10 wt. %, from 10 to 15 wt. %, from 10 to 20 wt. %, or from 15 to 20 wt. % resin as calculated by a weight of the proppant particles.

Figure 2:
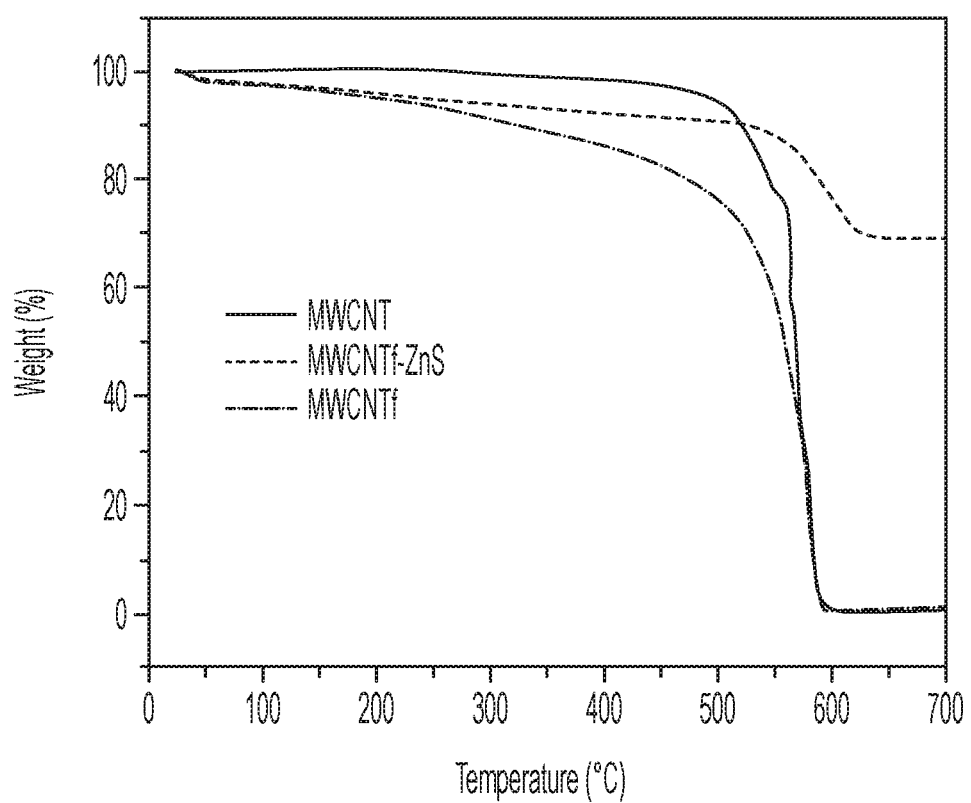
FIG. 2 graphically depicts weight loss as a function of temperature for multi-walled carbon nanotubes (MWCNT), functionalized MWCNT (MWCNTf) and ZnS-coated MWCNT (MWCNTf-ZnS) based nano-fillers.
Figure 3B:
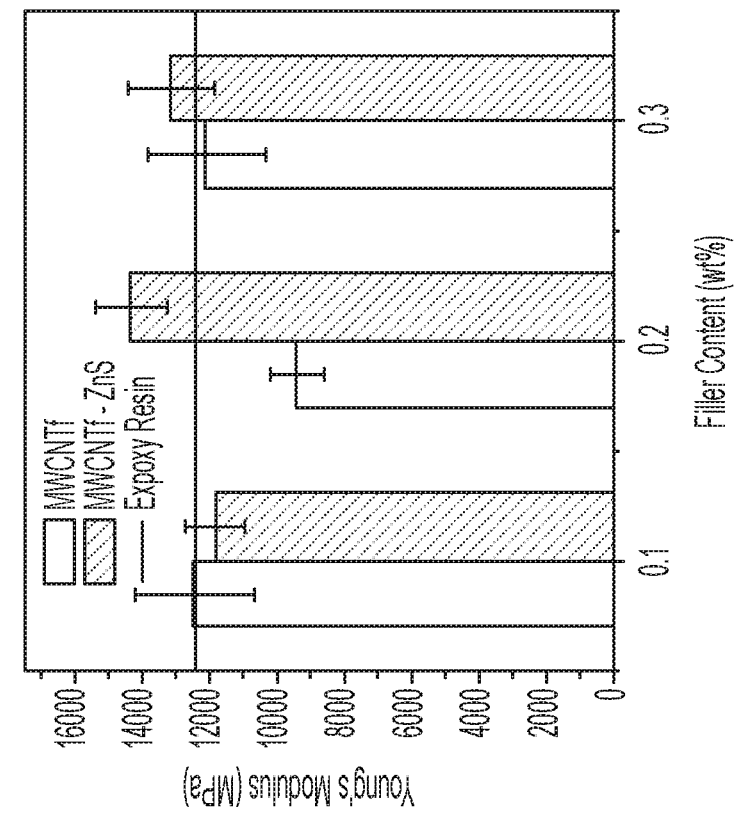
FIG. 3B shows the impact of ZnS coated multi-walled carbon nanotubes on the mechanical properties of epoxy composites.
Figure 3A:
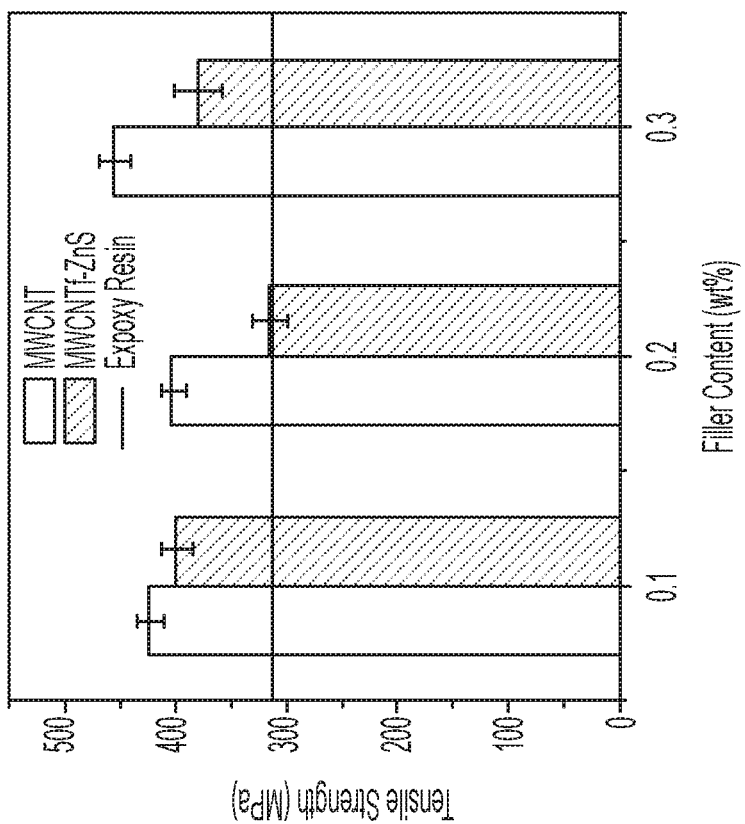
FIG. 3A shows the impact of ZnS coated multi-walled carbon nanotubes on the mechanical properties of epoxy composites.

In one embodiment, the nanocomposite proppant coating includes a coated carbon nanotube, such as zinc sulfide (ZnS) coated carbon nanotubes. ZnS coated carbon nanotubes provide additional thermal stability and mechanical strength. FIG. 2 graphically depicts weight loss as a function of temperature for multi-walled carbon nanotubes (MWCNT), functionalized MWCNT (MWCNTf) and ZnS coated MWCNT (MWCNTf-ZnS) based nano-fillers. The ZnS coated multi-walled carbon nanotubes retain significantly greater weight in thermo-gravimetric analysis (TGA) test compared to multi-walled carbon nanotubes without a ZnS coating. FIGS. 3A and 3B show the impact of ZnS coated multi-walled carbon nanotubes on the mechanical properties of epoxy composites, specifically the tensile strength and Young's modulus. Not intending to be limited by theory, the reduction in tensile strength may be dependent on the degree of defects introduced to the multi-walled carbon nanotubes and epoxy interfaces. The Young's modulus is at its greatest value when the filler content wt. % is approximately 0.2 wt. %, which is desired for proppant application.

In another embodiment, the nanocomposite proppant coating includes silica (SiO$_2$) coated single-walled carbon nanotubes (SWNT). SiO$_2$ coated carbon nanotubes may better fuse with neighboring proppants in a subsurface formation, generating a stronger proppant pack, which will mitigate proppant flowback.

The nanocomposite proppant coating may further comprise a tracer material. The suitable tracer material may include, but are not limited to, ionic contrast agents such as thorium dioxide (ThO$_2$), barium sulfate (BaSO$_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. %.

The nanocomposite proppant coating may further comprise a coupling agent. A coupling agent is a compound that provides a chemical bond between two dissimilar materials, such as an inorganic material and an organic material. The coupling agent may form a bond between the silica substrate and the resin. In some embodiments, the coupling agent may comprise at least one of 3-glycidoxypropyltrimethoxysilane, 3-aminopropyltriethoxysilane, 3-aminopropyltrimethoxysilane, and 3-chloropropyltrimethoxysilane. The coupling agent may comprise from 0.1 to 20 volume percent (vol. %), from 0.1 to 15 vol. %, from 0.1 to 10 vol. %, from 0.1 to 5 vol. %, from 0.1 to 3 vol. %, from 0.1 to 1 vol. %, from 0.1 to 0.5 vol %, 0.1 to 20 vol. %, from 0.5 to 20 vol. %, from 0.5 to 15 vol. %, from 0.5 to 10 vol. %, from 0.5 to 5 vol. %, from 0.5 to 3 vol. %, from 0.5 to 1 vol. %, from 1 to 20 vol. %, from 1 to 15 vol. %, from 1 to 10 vol. %, from 1 to 5 vol. %, from 1 to 3 vol. %, from 3 to 20 vol. %, from 3 to 15 vol. %, from 3 to 10 vol. %, from 3 to 5 vol. %, from 5 to 20 vol. %, from 5 to 15 vol. %, from 5 to 10 vol. %, from 10 to 20 vol. %, from 10 to 15 vol. %, or from 15 to 20 vol. % 3-glycidoxypropyltrimethoxysilane and from 80 to 99.9 vol. %, from 80 to 99.5 vol. %, from 80 to 99 vol. %, from 80 to 95 vol. %, from 80 to 90 vol. %, from 80 to 85 vol. %, from 85 to 99.9 vol. %, from 85 to 99.5 vol. %, from 85 to 99 vol. %, from 85 to 95 vol. %, from 85 to 90 vol. %, from 90 to 99.9 vol. %, from 90 to 99.5 vol. %, from 90 to 99 vol. %, from 90 to 95 vol. %, 95 to 99.9 vol. %, from 95 to 99.5 vol. %, from 95 to 99 vol. %, from 99 to 99.9 vol. %, from 99 to 99.5 vol. %, from 99 to 99.9 vol. %, or from 99.5 to 99.9 vol. % deionized water. The nanocomposite proppant coating may comprise from 0.001 to 20 wt. %, from 0.001 to 15 wt. %, from 0.001 to 10 wt. %, from 0.001 to 5 wt. %, from 0.001 to 2 wt. %, from 0.001 to 1 wt. %, from 0.001 to 0.2 wt. %, from 0.001 to 0.05 wt. %, from 0.05 to 20 wt. %, from 0.05 to 15 wt. %, from 0.05 to 10 wt. %, from 0.05 to 5 wt. %, from 0.05 to 2 wt. %, from 0.05 to 1 wt. %, from 0.05 to 0.2 wt. %, from 0.2 to 20 wt. %, from 0.2 to 15 wt. %, from 0.2 to 10 wt. %, from 0.2 to 5 wt. %, from 0.2 to 2 wt. %, from 0.2 to 1 wt. %, from 1 to 20 wt. %, from 1 to 15 wt. %, from 1 to 10 wt. %, from 1 to 5 wt. %, from 1 to 2 wt. %, from 2 to 20 wt. %, from 2 to 15 wt. %, from 2 to 10 wt. %, from 2 to 5 wt. %, from 5 to 20 wt. %, from 5 to 15 wt. %, from 5 to 10 wt. %, from 10 to 20 wt. %, from 10 to 15 wt. %, or from 15 to 20 wt. % coupling agent as calculated by a weight of the resin.

The nanocomposite proppant coating may further comprise a crosslinker. A crosslinker is a substance or agent that induces the subsurface formation of crosslinks. Mixing an unpolymerized or partially polymerized resin with a crosslinker results in a chemical reaction that crosslinks the resin. A crosslinked nanocomposite proppant coating may retain its shape without dissolving in the hydraulic fracturing fluid, while maintaining a sufficient attraction or bond to the proppant particle. The degree of crosslinking may be controlled by the molar or weight ratio of crosslinker to monomer. In some embodiments, the crosslinker may comprise at least one of hexamethylenetetramine, paraformaldehyde, oxazolidines, melamine resins, aldehyde donors, or resole polymers. The proppants may comprise from 8 to 20 wt. %, from 8 to 18 wt. %, from 8 to 15 wt. %, from 10 to 20 wt. %, from 10 to 18 wt. %, from 10 to 15 wt. %, from 13 to 20 wt. %, from 13 to 18 wt. %, or from 13 to 15 wt. % crosslinker as calculated by a weight of the resin.

In some embodiments, the nanocomposite proppant coating further includes a lubricating agent to reduce friction on the nanocomposite proppant coating. The lubricating agent may include at least one of calcium stearate or silicone oil. The nanocomposite proppant coating may comprise from 0.01 to 8 wt. %, from 0.01 to 3.75 wt. %, from 0.01 to 1.75 wt. %, from 0.25 to 8 wt. %, from 0.25 to 3.75 wt. %, from 0.25 to 1.75 wt. %, from 0.75 to 8 wt. %, from 0.75 to 3.75 wt. %, or from 0.75 to 1.75 wt. % lubricating agent as calculated by a weight of the resin.

The nanocomposite proppant coating may further include an accelerating agent. The accelerating agent may include at least one of hydrochloric acid, Lewis acid, boron trifluoride etherate, zinc or manganese ions, acetic acid, carboxylic acid, bases, such as sodium hydroxide, or salts, such as zinc acetate. The nanocomposite proppant coating may include from 1 to 70 wt. %, from 1 to 45 wt. %, from 1 to 20 wt. %, from 5 to 70 wt. %, from 5 to 45 wt. %, from 5 to 12 wt. %, from 12 to 70 wt. %, from 12 to 45 wt. %, from 12 to 20 wt. % accelerating agent as calculated by a weight of the proppant particles.

In some embodiments, the nanocomposite proppant coating may have hydrophobic tendencies, such as a lack of attraction to water, repulsion to water, or immiscibility in water. The nanocomposite proppant coating may not substantially dissolve (does not dissolve more than 10 wt. % or more than 8 wt. %, or more than 5 wt. % or more than 3 wt. %) when contacted with, submerged in, or otherwise exposed to water. In some embodiments, the nanocomposite proppant coating may not dissociate from the proppant particle when the multi-functional nanocomposite proppants are added to a water-based fluid, such as water or a fluid that includes water. Dissolution of the nanocomposite proppant coating in a fluid medium may be determined by any suitable analytical technique for detection of solvated coating material that is performed on a fluid medium to which a coated proppant particle has been added and allowed to equilibrate at room temperature for at least 24 hours. The proppants may comprise a water contact angle of at least 70°, 80°, 90°, 100°, 110°, 120°, 150°, or of 180°.

In some embodiments, the nanocomposite proppant coating may have oleophobic tendencies, such as a lack of attraction to hydrocarbons, repulsion to hydrocarbons, or immiscibility in hydrocarbons. The nanocomposite proppant coating may not substantially dissolve (does not dissolve more than 10 wt. % or more than 8 wt. %, or more than 5 wt. % or more than 3 wt. %) when contacted with, submerged in, or otherwise exposed to hydrocarbons. In some embodiments, the nanocomposite proppant coating may not dissociate from the proppant particle when the multi-functional nanocomposite proppants are added to a hydrocarbon-based fluid, oil or gas. Dissolution of the nanocomposite proppant coating in a fluid medium may be determined by any suitable analytical technique for detection of solvated coating material that is performed on a fluid medium to which a coated proppant particle has been added and allowed to equilibrate at room temperature for at least 24 hours. The proppants may comprise a condensate contact angle of from 40° to 70°, from 50° to 70°, from 50° to 60°, of at least 70°, 80°, 90°, 100°, 110°, 120°, 150°, or of 180°.

The nanocomposite proppant coating may be formed by mixing nano-reinforcing agents and a dispersing agent in organic and inorganic solvents. This may result in an enhancement in proppant performance. Without being bound by theory, nano-reinforcing agents with an aspect ratio of greater than 100, 500, 1,000, 5,000, 10,000 or 50,000 may act bridging agents within the proppant coating. This may increase the mechanical strength to protect the proppant coating from cracks and fractures. An improvement in electrical and thermal conductivity and resistance to chemical degradation at elevated temperature have also been observed.

Electrically conductive proppants may be detected and mapped by electromagnetic induction. This method has the potential to estimate not only the propped length, height, and orientation of hydraulic fractures but also the vertical distribution of proppants within the fracture. Electromagnetic induction tools may be used to detect far-field anomalies in the rock matrix from a single borehole. The electrical conductivity, an inherent property of the carbon nanotube (MWNT) and graphene, can be introduced to the proppant coating. This allows for the location of the conductive proppants to be tracked using the modern electromagnetic logging tool. Therefore, it can be used to track fractures that are hydraulically connected to natural aquifers.

Reinforcing the resin matrix by mixing in two nano-reinforcing agents may increase the proppant crush resistance performance. The two nano-reinforcing agents may include: (1) the nano-reinforcing agent in the form of tubes, fibers, rope, fibrils, or combinations of these dispersed in the proppant coating and bonded to (2) the nano-reinforcing agent in the form of platelets, 2-Dimensional (2D) surface, ribbons, or combinations of these. In some embodiments, the two nano-reinforcing agents may include carbon nanotubes (which have an aspect ratio of greater than 100) and graphene (which provides a 2D planar surface) adds mechanical bridging throughout the proppant coating. This synergistic effect further improves electrical conductivity as compared to a proppant coating including carbon nanotubes without graphene.

In embodiments, CNTs may be connected to a graphene layer through sp2 covalent bonds to represent rebar graphene samples. The CNTs bridge the crack surfaces and fail as the crack propagates, thereby improving the strength of the proppant coating as compared to a proppant coating without CNT bridging. In some embodiments, the measured fracture energy, G, ranges from 12 to 50 milliJoules per square meter ($mJ/m^2$), from 12 to 45 $J/m^2$, from 12 to 40 $J/m^2$, from 12 to 35 $J/m^2$, from 15 to 50 $J/m^2$, from 15 to 45 $J/m^2$, from 15 to 40 $J/m^2$, from 15 to 35 $J/m^2$, from 20 to 50 $J/m^2$, from 20 to 45 $J/m^2$, from 20 to 40 $J/m^2$, from 20 to 35 $J/m^2$, from 25 to 50 $J/m^2$, from 25 to 45 $J/m^2$, from 25 to 40 $J/m^2$, from 25 to 35 $J/m^2$, from 30 to 50 $J/m^2$, from 30 to 45 $J/m^2$, from 30 to 40 $J/m^2$, from 30 to 35 $J/m^2$, from 35 to 50 $J/m^2$, from 35 to 45 $J/m^2$, from 35 to 40 $J/m^2$, from 40 to 50 $J/m^2$, from 40 to 45 $J/m^2$, or from 45 to 50 $J/m^2$. In some embodiments, G is 38.9 $J/m^2$, obtained via molecular dynamic simulation software such as Amsterdam Density Functional available from Software for Chemistry & Materials headquartered in Amsterdam, the Netherlands. The measured fracture energy of the nanotubes strengthened with graphene is greater than that of graphene alone. Graphene on its own (without CNT bridging) has a measured fracture energy of 11.9 $J/m^2$, obtained via MD simulations.

Referring again to FIG. 1, in one or more embodiments, the proppant particle 100 may be coated with a nanocomposite proppant coating 110 during a coating step 200 to produce, form, or result in a multi-functional nanocomposite coated proppant. In some embodiments, the nanocomposite proppant coating 110 may be a surface layer on or bound to the proppant particle 100. Such a surface layer may coat at least a portion of the surface of the proppant particle 100. The nanocomposite proppant coating 110 may coat the entire surface of the proppant particle 100 (as shown) or, alternatively, may only partially surround the proppant particle 100 (not shown), leaving at least a portion of surface of the proppant particle 100 uncoated or otherwise exposed. Also not shown, the nanocomposite proppant coating 110 may be the outermost coating of the proppant particle with one or more other intervening coatings positioned between the nanocomposite proppant coating 110 and the proppant particle 100. This means that in such an embodiment the nanocomposite proppant coating 110 is coupled to the proppant particle 100 as opposed to contacting the proppant particle 100 as shown in FIG. 1.

Further embodiments of the present disclosure are directed to methods for producing nanocomposite coated proppant. In some embodiments, the method may include mixing the nano-reinforcing agent, surface modifier, and resin into a mixture; and coating the proppant particles with the mixture. The method for producing a multi-functional nanocomposite proppants may include coating the proppant particle using a two-layer coating or multi-layered coating system. The method may include coating the proppant particles with the resin, mixing the nano-reinforcing agent and the surface modifier to form a mixture, and coating the proppant particles with the mixture. In some embodiments, the method may further include melting the resin prior to the coating step, in the case of a solid resin, such as novolac.

The method may further include coating the proppants with a coupling agent or a crosslinker. In some embodiments, the method further includes employing a lubricating agent or an accelerating agent. In other embodiments, the method includes coating proppant particles with a top coating. The top coating may be an overlying layer that may be added for additional properties or features. As a non-limiting example, additional coatings may be used in conjunction with, or may comprise, a breaker. As used throughout this disclosure, a "breaker" refers to a compound that may break or degrade the coating after a fracturing operation to prevent subsurface formation damage. In some embodiments, the breaker may be an oxidizer or enzyme breaker. The breaker may be any suitable materials capable of degrading a coating material.

The method for producing multi-functional nanocomposite proppants may include calcining the proppant particle up to 100° F., 200° F., 300° F., 350° F., 370° F., 400° F., 450° F., or 500° F. prior to the coating step. The calcining may include application of heat by any suitable process such as by forced hot air heating, convection, friction, conduction, combustion, exothermic reactions, microwave heating, or infrared radiation, for example.

In some embodiments, the method may further comprise roughening the proppant particles before the coating step. The proppant particles may be chemically or physically roughened, as previously described.

In some embodiments, the coating step may include contacting the proppant particle with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the coated proppants to prevent agglomeration or clumping. The coating step may include adding another compound to the mixture, such as a solvent, an initiator, an adhesion promoter, or an additive, to form the nanocomposite proppant coating. In some embodiments, the coating process may be conducted with an emulsion coating technique. In some embodiments, the adhesion promoter may comprise a silane (for example, amino silane) or a silane-containing monomer. In some embodiments, an adhesion promoter may not be necessary to coat the proppant particles.

In some embodiments, the nano-reinforcing agent may include dry powder, liquid dispersion (an aqueous and organic solvent of nano-reinforcing agents), or both. In some embodiments, dry powder is directly added to the resin after the resin is melted on the pre-heated sand inside the mixer.

In some embodiments, liquid dispersion is directly added to the resin after the resin is melted on the pre-heated sand inside the mixer.

In some embodiments, liquid dispersion is directly added to the dry resin in pastille form (ribbon mixing) and then added to the pre-heated sand inside the mixer. Resin pastilles may be melted at 100° C. Liquid dispersion may be mixed with the melted resin pastilles to form a mixture. In some embodiments, the method includes cooling the mixture and drying the mixture at about 20° C. thereby forming a solid. The method may further include grinding the solid into smaller pieces to form modified resin. This modified resin may be introduced to the pre-heated sand to complete the coating process without further introduction of any nano-reinforcing agent dispersion.

In some embodiments, liquid dispersion is directly added to the resin in ground powder form and then added to the pre-heated sand inside the mixer. In some embodiments, liquid dispersion is directly added to the cross-linker and then added to the pre-heated sand inside the mixer. In some embodiments, carbon nanotubes, graphene, or both were added to the pre-heated sand before adding resin inside the mixture. The carbon nanotubes may include a dry nanotube powder or in a liquid nanotube dispersion. The graphene may include a dry graphene powder or a liquid graphene dispersion.

A method for increasing a rate of hydrocarbon production from a subsurface formation is also disclosed. A hydraulic fracturing fluid may be used to propagate fractures within a subsurface formation and further open fractures. Nanocomposite coated proppants within a hydraulic fracturing fluid may aid in treating subsurface fractures, to prop open and keep open the fracture. The method may include producing a first rate of production of hydrocarbons from the subsurface formation, in which the hydrocarbons comprise a first interfacial tension, introducing a hydraulic fracturing fluid comprising the nanocomposite coated proppants into the subsurface formation, in which the proppants reduce the first interfacial tension of the hydrocarbons to a second interfacial tension, thereby reducing condensate banking or water blockage near a wellbore, and increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may comprise nanocomposite coated proppants suspended in the hydraulic fracturing fluid. In some embodiments, the nanocomposite coated proppants may be distributed throughout the hydraulic fracturing fluid. The nanocomposite coated proppants may not aggregate or otherwise coalesce within the subsurface formation, owing in part to the wettability characteristics of the nanocomposite proppant coating. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in subsurface formation.

EXAMPLES

The following examples illustrate features of the present disclosure but are not intended to limit the scope of the disclosure.

Example 1

An example coating recipe at a target mixing temperature of 370° F., without additives, is described in Table 1. The process is accomplished in about 3-8 minutes after preheating the sand, including dead times while maintaining target temperature.

TABLE 1

Steps to achieve nanocomposite coated proppants without a surface modifier or other additives.

| Coating Steps |
|---|
| 1 Preheat 150 grams (g) of sand (30/50 mesh (300 μm to 600 μm)) in a beaker to 370° F. Mix at 600 revolutions per minute (rpm) with overhead mixer. |
| 2 Add 57-64 mg multi-walled carbon nanotubes (MWNT) CTUBE 199P (1.0 wt. % of phenolic resin) into sand. |
| 3 Mix for approximately 2-3 minutes (min) (depending upon dispersibility of nano-reinforcing agents). Sample becomes dark brown. |
| 4 Add 5.7-6.4 g phenolic resin (Plenco 14542 (available from Plastics Engineering Company, headquartered in Sheboygan, Wisconsin), 3.8 wt. % of sand). Sample becomes a darker shade. Increase overhead mixer speed to 2300 rpm. |
| 5 Mix with spatula and overhead mixture for approximately 2 min maintaining the temp 370° F. Ensure all sand is coated evenly. |
| 6 Add 0.74-0.96 g of hexamethylenetetramine (13-15 wt. % of phenolic resin). |
| 7 Continue mixing with overhead mixer, maintaining temperature, for approximately 3 min. |
| 8 Mix until the sand is dry and sieve according to mesh size. |

TABLE 2

Properties of MWNT CTUBE 199P, produced by CNT Company, Ltd.

| | MWNT CTUBE 199P |
|---|---|
| Appearance | Black powder |
| Purity, wt. % | ≥98.5 |
| Average diameter, nm | 100-200 |
| Length, μm | 8 |
| Metal oxide, wt. % | ≤1.5 |
| Bulk density, g/cm$^3$ | 0.06-0.08 |
| Specific surface area, m$^2$/g | 400-700 |

Example 2

An example coating recipe at a target mixing temperature of 250° F., with additives, is described in Table 3. The process is accomplished in approximately 30 minutes after preheating the sand, including dead times while maintaining target temperature.

TABLE 3

Steps to achieve nanocomposite coated proppants
with a surface modifier and other additives.

Coating Steps

1. Preheat 150 g of 30/50 mesh sand in a beaker to 250° F. Mix at 800 rpm with overhead mixer.
2. Add 2.0 milliLiter (mL) solution of 1.0 vol % of 3-glycidoxypropyltrimethoxysilane, 97% in deionized water (0.02-0.05 mL of coupling agent and rest of deionized water) to the sand.
3. Mix with spatula and overhead mixer for approximately 1 min.
4. Add 57-64 mg MWNT CTUBE 199P (1.0 wt. % of phenolic resin) into sand.
5. Mix for approximately 2-5 min (depending upon dispersibility of nano-reinforcing agents). Sample becomes dark brown.
6. Add 5.7-6.4 g of phenolic resin (Plenco 14542, ~3.8-4.2 wt. % of sand) mix for approximately 5 min. Sample becomes a darker shade. Mix with both spatula and overhead mixer. Increase overhead mixer speed to 2300 rpm.
7. Ensure all sand is coated evenly and temperature is maintained at 250° F.
8. Add 1 mL of HCl (1.0M 37%). Temperature decreases. First trace of fumes. This step only applies for temperatures of less than 300° F.
9. Add 0.74-0.96 g hexamethylenetetramine (13-15 wt. % of phenolic resin).
10. Mix with spatula and overhead mixer for approximately 10 min, maintaining the temperature at 250° F.
11. Add 0.075 g pure calcium stearate powder (0.05 wt. % of sand) to the mixture.
12. Add 2.0 mL alkyl fluorosilane (Dynasylan ® F 8263, produced by Evonik Industries) (5.0 vol. %) in deionized water (0.1 mL of Dynasylan ® F8263 and 1.9 mL of deionized water) to the nanocomposite coated sand.
13. Mix until the sand is dry and sieve according to mesh size.

Example 3

Figure 4:
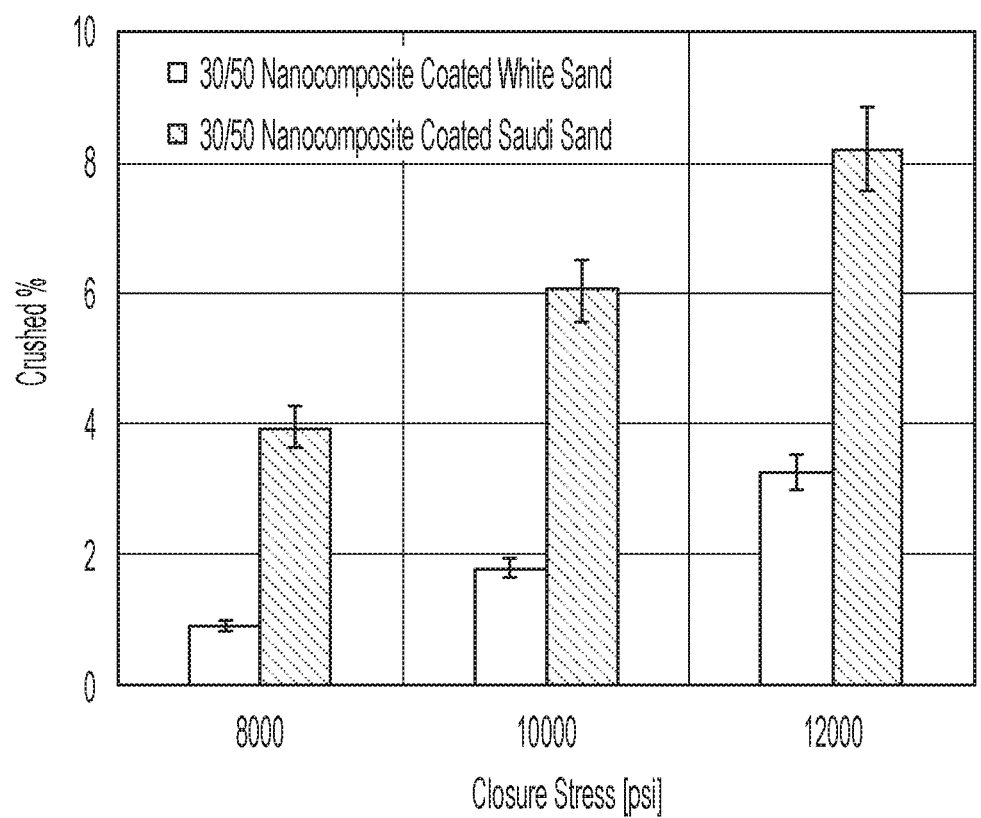
FIG. 4 graphically depicts the fines generation percentage of various proppants at various pressures, according to one or more embodiments described in this disclosure.

FIG. 4 compares the fines generation percentage of 30/50 mesh (300 μm to 600 μm) nanocomposite coated Saudi sand (NCSS) and nanocomposite coated Northern White sand (NCWS) produced with a coating temperature of 370° F. This NCSS was prepared according to Example 1. It is observed that nanocomposite coating reduces the amount of fines generated by an order of magnitude in comparison to uncoated sand at all stress levels and that nanocomposite coated sand performance is driven by its core grains, as the NCWS generated more than twice as much fines as the NCSS. At 8,000 pounds per square inch (psi) closure stress, the NCWS produced 4% fines, whereas the NCSS produced less than 1% fines. At 10,000 psi closure stress, the NCWS produced 6% fines, whereas the NCSS produced less than 2% fines. At 12,000 psi closure stress, the NCWS produced more than 8% fines, whereas the NCSS produced less than 4% fines.

Example 4

Figure 5:
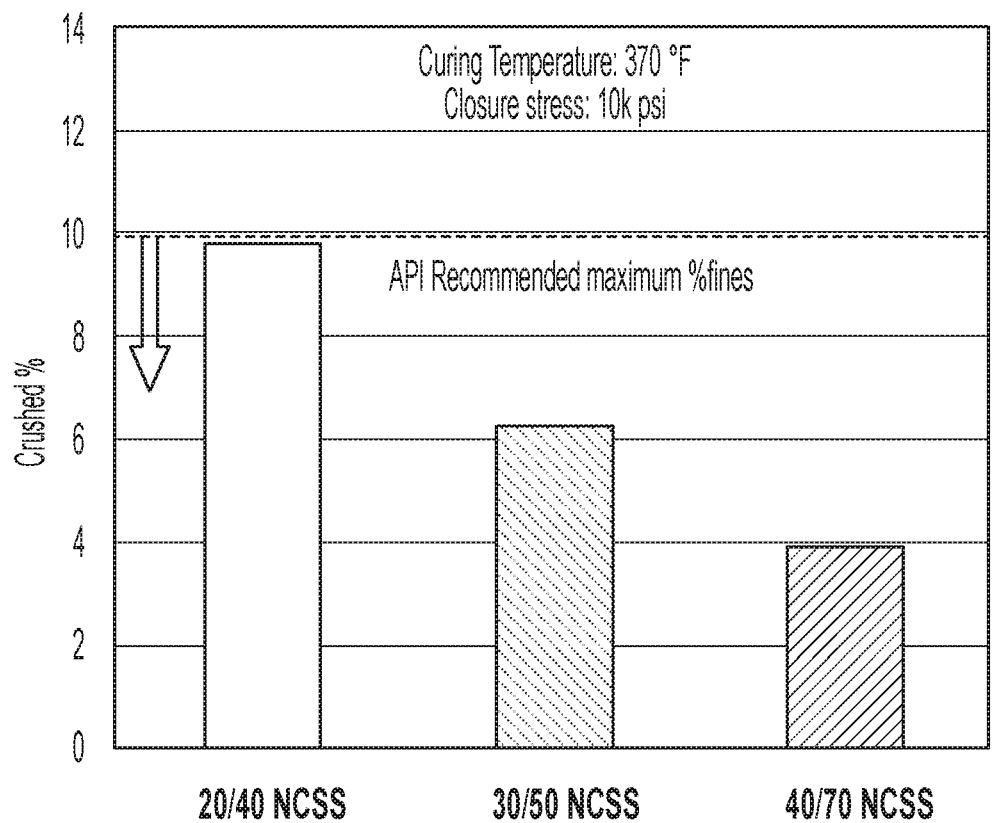
FIG. 5 graphically depicts the API crush resistance stress of various proppants at various pressures, according to one or more embodiments described in this disclosure.
Figure 6:
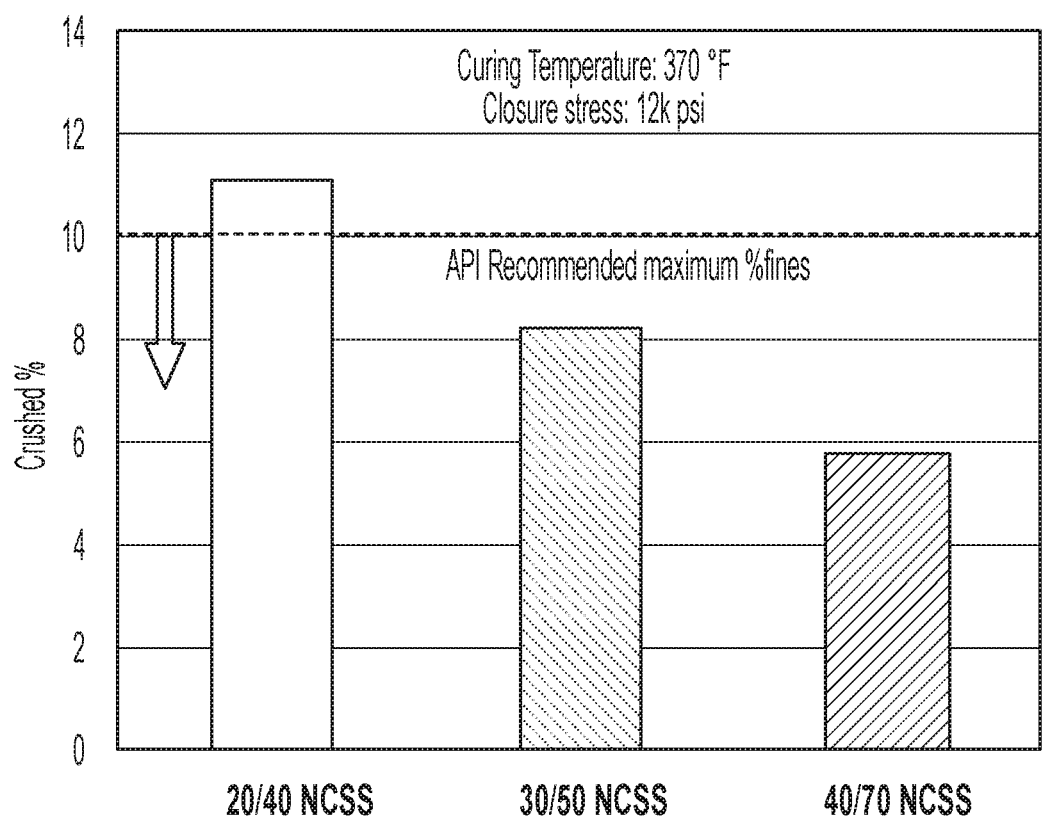
FIG. 6 graphically depicts the API crush resistance stress of various proppants at various pressures, according to one or more embodiments described in this disclosure.
Figure 7:
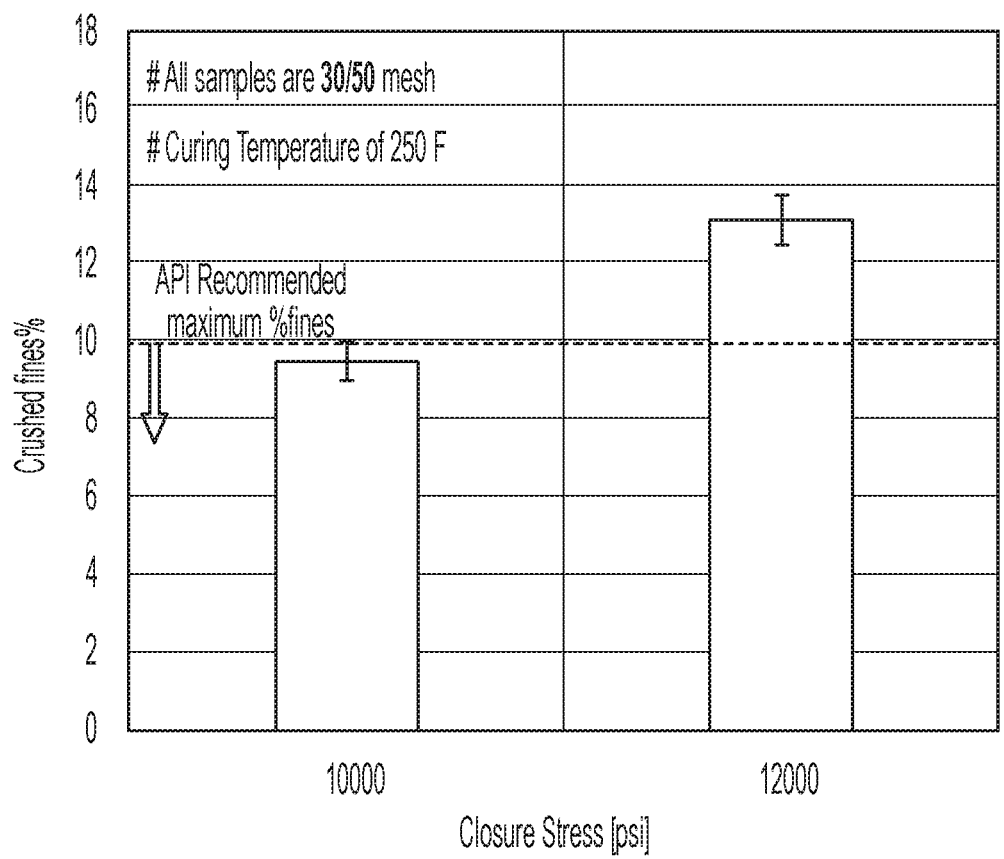
FIG. 7 graphically depicts the API crush resistance stress of various proppants at various pressures, according to one or more embodiments described in this disclosure.

The API crush resistance stress (K-values) of various NCSS are shown in FIGS. 5, 6, and 7. The NCSS of FIGS. 5 and 6 was prepared according to Example 1. The NCSS of FIG. 7 was prepared according to Example 2. The API crush resistance stress of 20/40, 30/50, and 40/70 mesh NCSS is shown in FIGS. 5 and 6, for a coating temperature of 370° F. For 20/40 mesh NCSS coated at 370° F., the API crush resistance stress is approximately 10,000 psi. For 30/50 mesh NCSS coated at 370° F., the API crush resistance stress is greater than 12,000 psi. For 40/70 mesh NCSS coated at 370° F., the API crush resistance stress is greater than 14,000 psi. The API crush resistance stress of 30/50 mesh NCSS is shown in FIG. 7, for a coating temperature of 250° F. For 30/50 mesh NCSS coated at 250° F., the API crush resistance stress is approximately 10,000 psi.

Example 5

Figure 8:
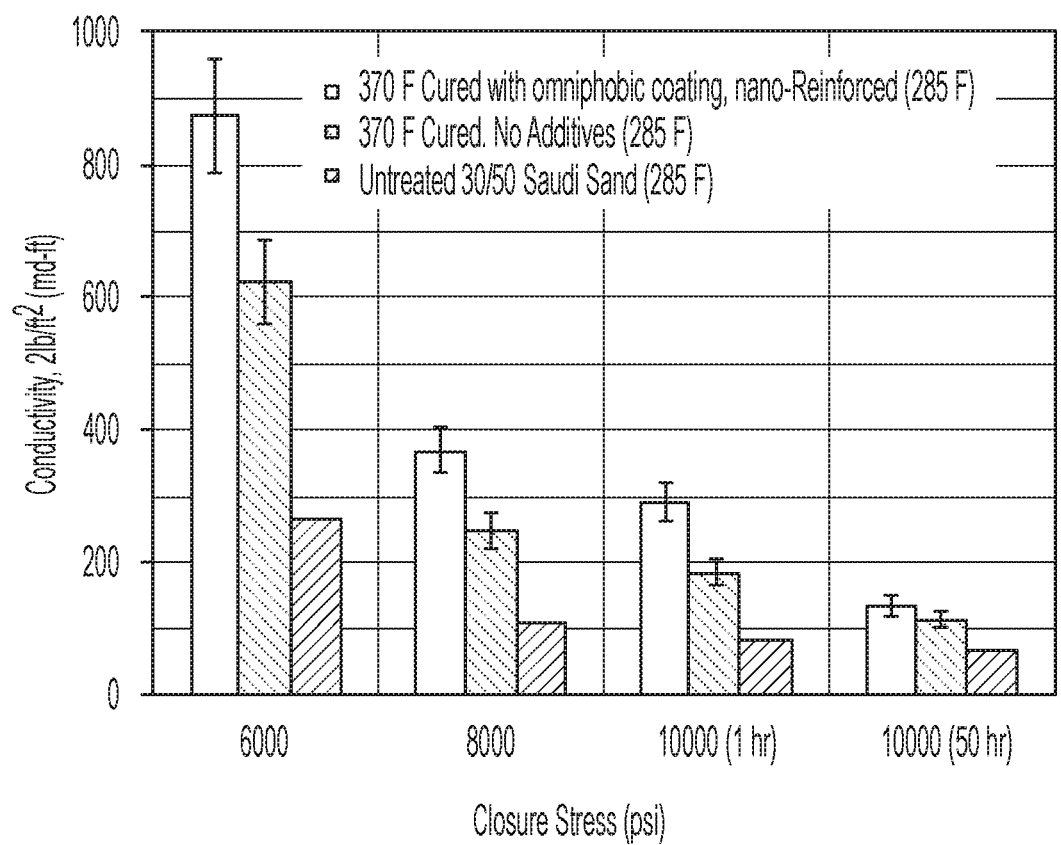
FIG. 8 graphically depicts the conductivity of various proppant samples at various pressures, according to one or more embodiments described in this disclosure.

API conductivity tests were run on various proppant samples. FIGS. 8-11 graphically depict these API conductivity test results conducted at various closure stresses. The NCSS of FIG. 8 was prepared according to Example 1. FIG. 8 shows the increased conductivity of 30/50 mesh NCSS with both nano-reinforcing agents and a surface modifier coated at 285° F. and cured at 370° F. as compared to 30/50 mesh NCSS without a surface modifier coated at 285° F. and cured at 370° F. FIG. 8 also shows the increased conductivity of 30/50 mesh NCSS with both nano-reinforcing agents and a surface modifier coated at 285° F. and cured at 370° F. and 30/50 mesh NCSS without a surface modifier coated at 285° F. and cured at 370° F. as compared to untreated 30/50 mesh Saudi sand. The conductivity was measured at 6,000 psi, 8,000 psi, 10,000 psi (at 1 hr), and 10,000 psi (at 50 hr).

Figure 9:
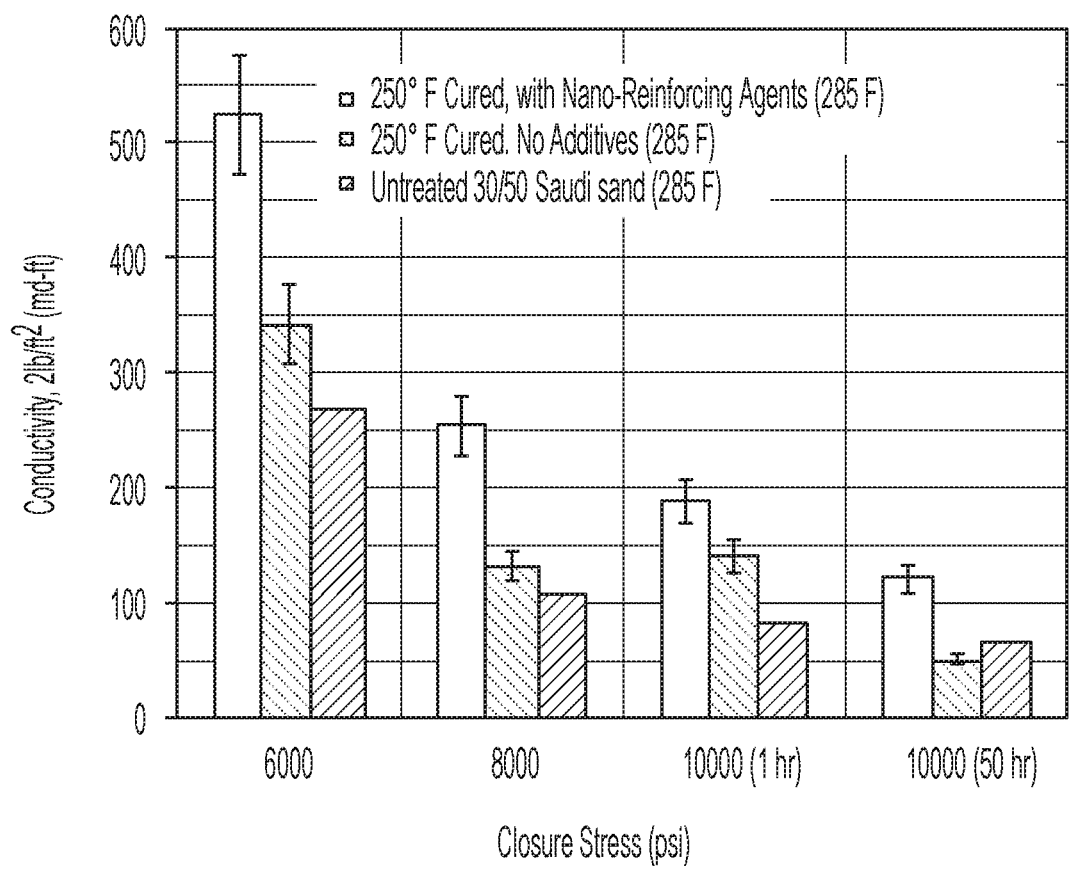
FIG. 9 graphically depicts the conductivity of various proppant samples at various pressures, according to one or more embodiments described in this disclosure.

FIG. 9 graphically depicts the increased conductivity of 30/50 mesh NCSS with both nano-reinforcing agents and a surface modifier coated at 285° F. and cured at 250° F. as compared to 30/50 mesh NCSS without a surface modifier coated at 285° F. and cured at 250° F. The NCSS of FIG. 9 was prepared according to Example 2. FIG. 9 also shows the increased conductivity of 30/50 mesh NCSS with both nano-reinforcing agents and a surface modifier coated at 285° F. and cured at 250° F. and 30/50 mesh NCSS without a surface modifier coated at 285° F. and cured at 250° F. as compared to untreated 30/50 mesh Saudi sand. The conductivity was measured 6,000 psi, 8,000 psi, 10,000 psi (at 1 hr), and 10,000 psi (at 50 hr).

Figure 10:
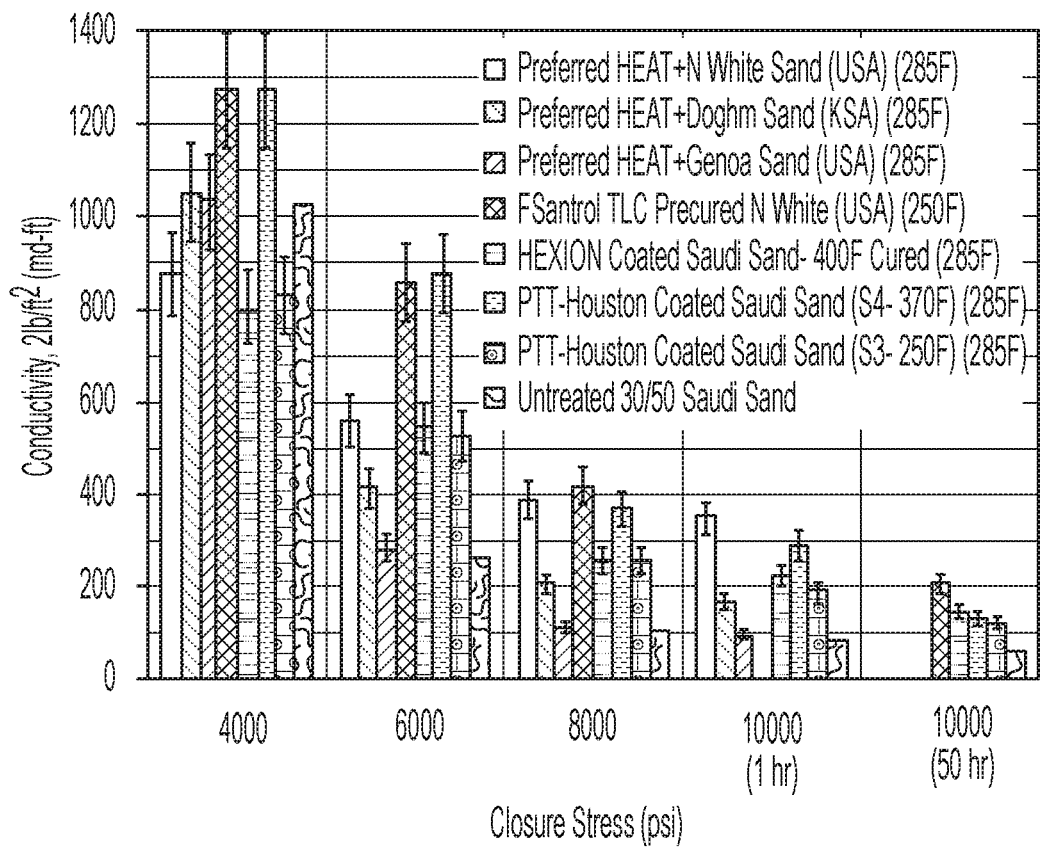
FIG. 10 graphically depicts the conductivity of various proppant samples at various pressures, according to one or more embodiments described in this disclosure.

FIG. 10 graphically depicts the conductivity of 30/50 mesh Saudi sand coated with Hexion™ (headquartered in Columbus, Ohio) resin at 285° F. and cured at 400° F., 30/50 mesh Saudi sand coated with PTT Global Chemical resin (available in Houston, Tex.) at 285° F. and cured at 370° F., prepared according to Example 1, 30/50 mesh Saudi sand coated with PTT Global Chemical resin at 285° F. and cured at 250° F., prepared according to Example 2, compared to the conductivity of untreated (meaning no resin coating) 30/50 mesh Saudi sand, 30/50 mesh north white sand coated with RCS HEAT® resin (available from Preferred Sands headquartered in Radnor, Pa.), 30/50 mesh Doghm sand coated with RCS HEAT® resin, 30/50 mesh Genoa sand coated with RCS HEAT® resin, and TLC® Precured north white sand coated with phenol-formaldehyde novolac resin (available from Santrol Proppants headquartered in Fresno, Tex.). The conductivity was measured at 4,000 psi, 6,000 psi, 8,000 psi, 10,000 psi (at 1 hr), and 10,000 psi (at 50 hr).

Figure 11:
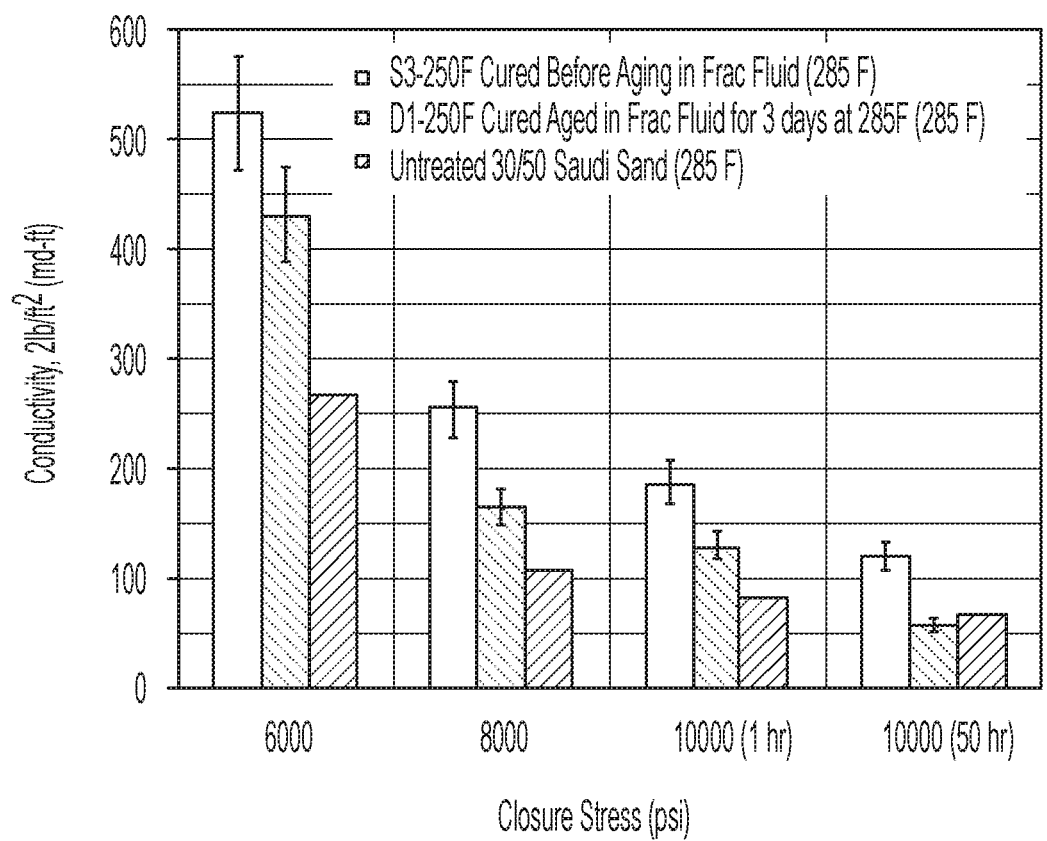
FIG. 11 graphically depicts the conductivity of various proppant samples at various pressures, according to one or more embodiments described in this disclosure.
Figure 12A:
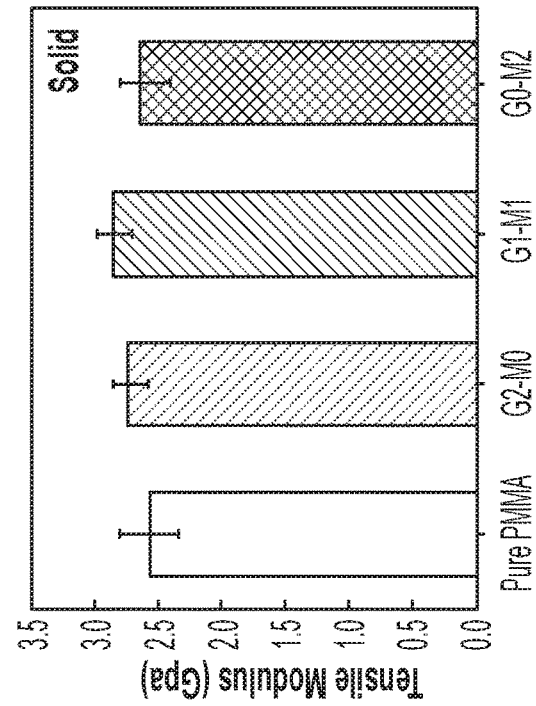
FIG. 12A graphically depicts the mechanical properties of poly(methyl methacrylate) PMMA nanocomposites, according to one or more embodiments described in this disclosure.
Figure 12B:
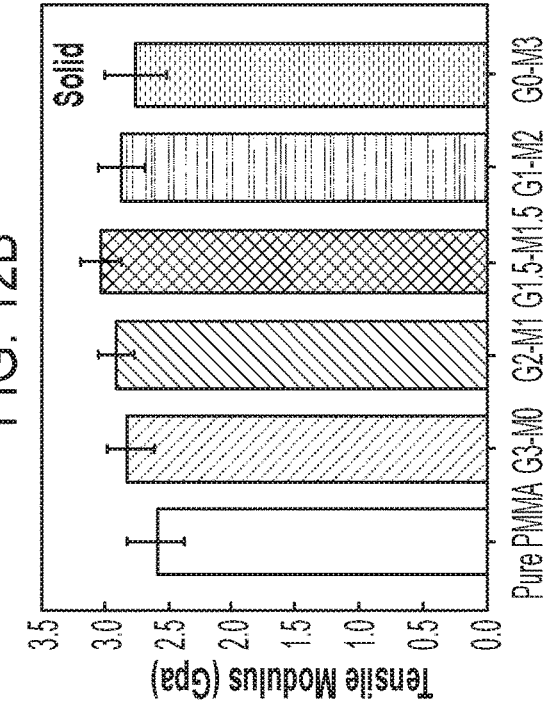
FIG. 12B graphically depicts the mechanical properties of poly(methyl methacrylate) PMMA nanocomposites, according to one or more embodiments described in this disclosure.
Figure 12C:
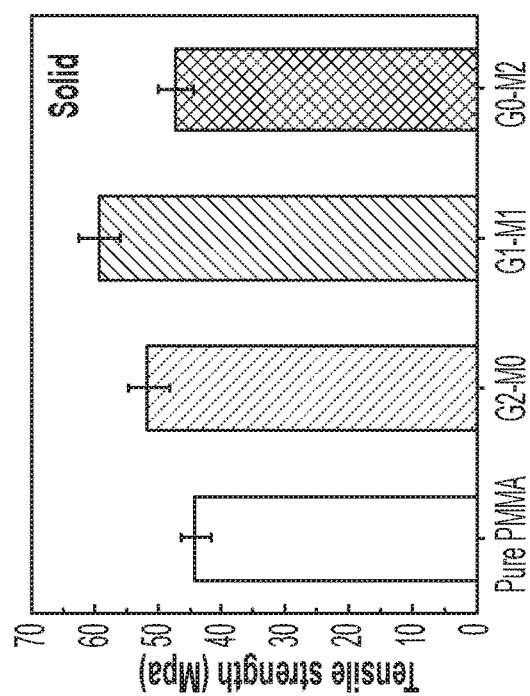
FIG. 12C graphically depicts the mechanical properties of poly(methyl methacrylate) PMMA nanocomposites, according to one or more embodiments described in this disclosure.
Figure 12D:
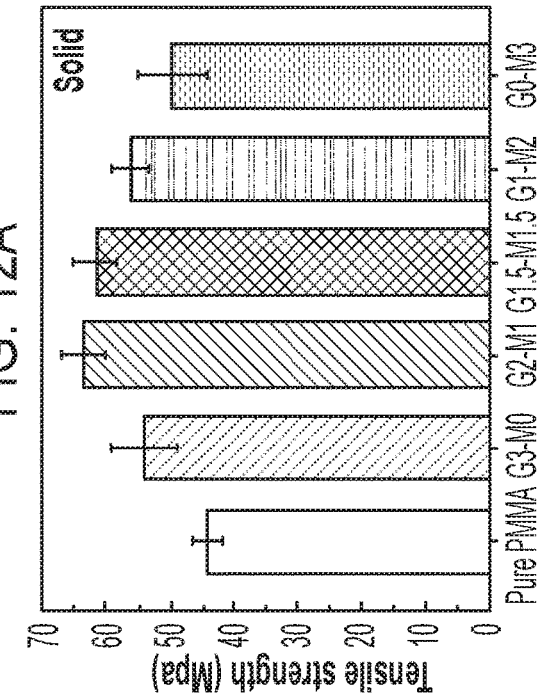
FIG. 12D graphically depicts the mechanical properties of poly(methyl methacrylate) PMMA nanocomposites, according to one or more embodiments described in this disclosure.

FIG. 11 graphically depicts the conductivity of 30/50 mesh NCSS coated at 285° F. and cured at 250° F., 30/50 mesh NCSS coated at 285° F. and cured at 250° F. aged in a hydraulic fracturing fluid for 3 days at 285° F., and untreated 30/50 mesh Saudi sand. The NCSS of FIG. 11 was prepared according to Example 2. Both NCSS samples yielded a greater conductivity than the untreated Saudi sand. Although the NCSS aged in a hydraulic fracturing fluid yielded a lesser conductivity than the unaged NCSS, the NCSS aged in a hydraulic fracturing fluid had a greater conductivity than the untreated Saudi sand. The conductivity was measured at 6,000 psi, 8,000 psi, 10,000 psi (at 1 hr), and 10,000 psi (at 50 hr).

From these API conductivity tests, it was determined that nano-reinforced novolac resin enhances the conductivity of the proppant.

Example 6

A fully cured resin coated sand (RCS) sample should not react to solvent such as acetone where the amine present in the phenolic resin reacts to the acetone and is released from the solid coating phase into the liquid phase. An acetone leaching test was conducted to determine if there was a difference in the curing of the RCS including CNTs and the RCS including CNTs and graphene. The RCS with graphene did not show reactivity, leaving the liquid phase color unchanged. Whereas the RCS sample including only CNT's shows components of the coating chemicals is dissolved by the solvent and goes into the liquid phase, turning the solvent color to bright yellow. Though both RCS samples were prepared to be pre-cured (fully cured or degree of curability to be >95%), the one with graphene in it shows extra curability not leaching away its amine group in the solvent.

Example 7

Stress tests were conducted to determine the tensile strength and Young's modulus for a variety of proppant coatings. FIGS. 12A-D show the properties of poly(methyl methacrylate) (PMMA) proppant coating including graphene nanotubes (GNP) and carbon nanotubes (PMMA/GNPs-MWCNTs): (A) tensile strength for PMMA coating with up to 2 wt. % carbon nanotubes and graphene, (B) Young's modulus for PMMA/GNPs-MWCNTs system with up to 2 wt. % nano-reinforcing agent; (C) tensile strength for PMMA/GNPs-MWCNTs system with up to 3 wt. % nano-reinforcing agent; and (D) Young's modulus for PMMA/GNPs-MWCNTs system with up to 3 wt. % nano-reinforcing agent. As expected, the tensile properties of the various composites exhibit different levels of reinforcement compared to that of pure PMMA at the current filler loading. Table 4 shows the amount of nano-reinforcing agent present in each of the example composites used in testing.

TABLE 4

Amount of nano-reinforcing agent present in tested example composites.

| Example | Amount of Graphene Nanotube (GNT) (wt. %) | Amount of MWCNT (wt. %) |
| --- | --- | --- |
| Pure PMMA | 0 | 0 |
| G3-M0 | 3.0 | 0 |
| G2-M1 | 2.0 | 1.0 |
| G1.5-M1.5 | 1.5 | 1.5 |
| G1-M2 | 1.0 | 2.0 |
| G0-M3 | 0 | 3.0 |

The ternary PMMA/GNPs-MWCNTs composites exhibited a considerably greater tensile strength than the single-CNTs and the single-GNPs based composites systems. The tensile strength of pure PMMA was 44.27 MPa (100 MPa=1 GPa). While G2-M0 (improved by 16%) and G0-M2 (improved by 7%) showed relatively insignificant improvement in the tensile properties, the tensile strength of G1-M1 was 59.3 MPa, an increase of 34%. In the composite system with 3 wt. % filler content, the tensile strengths of G2-M1, G1.5-M1.5, and G1-M2 also exhibited significant enhancement in comparison with that of the single-filler composites. A similar increasing trend was observed for the Young's modulus of the composites. The coexistence of nanotubes and graphene fillers shows a distinct synergistic effect in improving the tensile properties. The ability of nanotubes and graphene to synergistically reinforce the polymer matrix is ascribed to the strong interfacial interaction between filler and matrix and the nanotube-graphene interconnections. Specifically, the molecular couplings between the nanotubes and graphene may transfer load when the proppant coating is under stress. Furthermore, the MWCNTs-GNPs network structures may dissipate mechanical energy throughout the proppant coating.

Example 8

Figure 13:
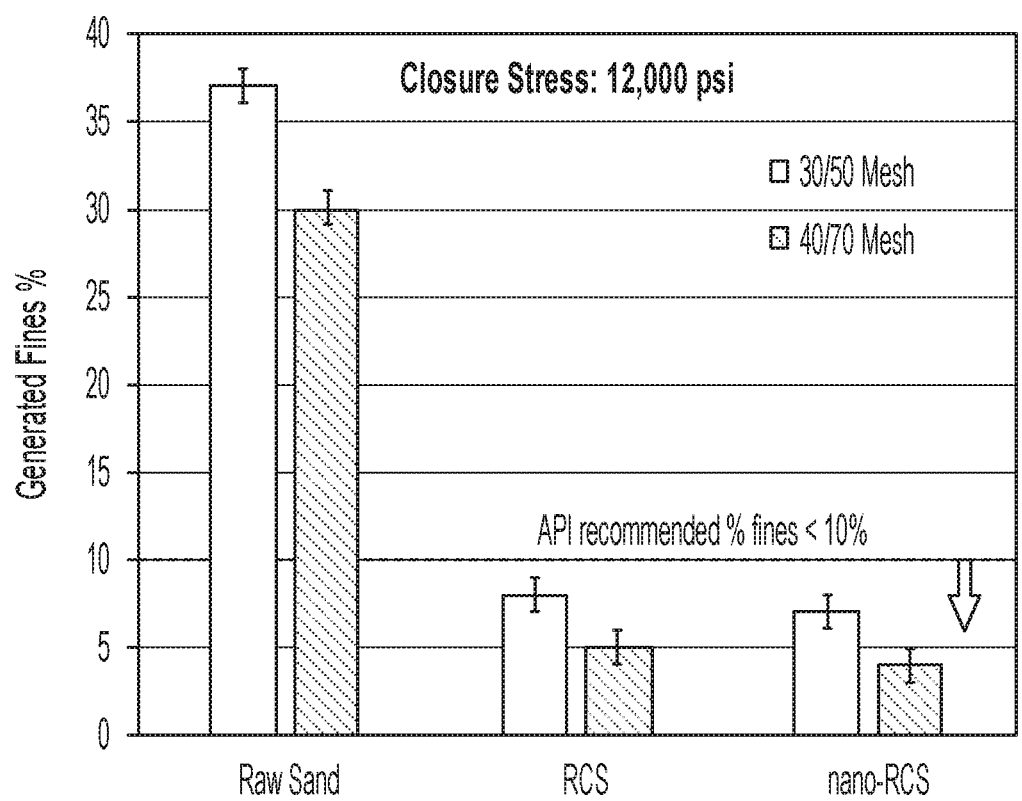
FIG. 13 graphically depicts the percent of fines generated under a closure stress of 12,000 pounds per square inch (psi), according to one or more embodiments described in this disclosure.

American Petroleum Institute (API) crush resistance stress tests were conducted on various proppants to determine the percentage (%) of fines generation at 12,000 psi. FIG. 13 shows the API crush resistance stress test conducted on 30/50 and 40/70 mesh uncoated raw sand, resin coated sand (RCS), and RCS including carbon nanotubes (nano-RCS), following ISO 13503-2:2006 protocol. The closure stress of 12,000 psi clearly exceeded the crush resistance stress level of the raw sand. Because of smaller size and increase in surface area that leads to an increase in the number of points of contact between the sand particles, 40/70 mesh sand generated less fines than 30/50 mesh sand for each three cases. As shown, the resin-coated sand (RCS) generated about 7% fines under 12,000 psi closure stress for 30/50 mesh, and about 5% fines under 12,000 psi closure stress for 40/70 mesh. Furthermore, the nano-RCS generated about 5% fines under 12,000 psi closure stress for 30/50 mesh, and about 4% fines under 12,000 psi closure stress for 40/70 mesh. Therefore, the RCS including carbon nanotubes outperformed both raw sand and RCS in the API crush resistance stress test.

Figure 14:
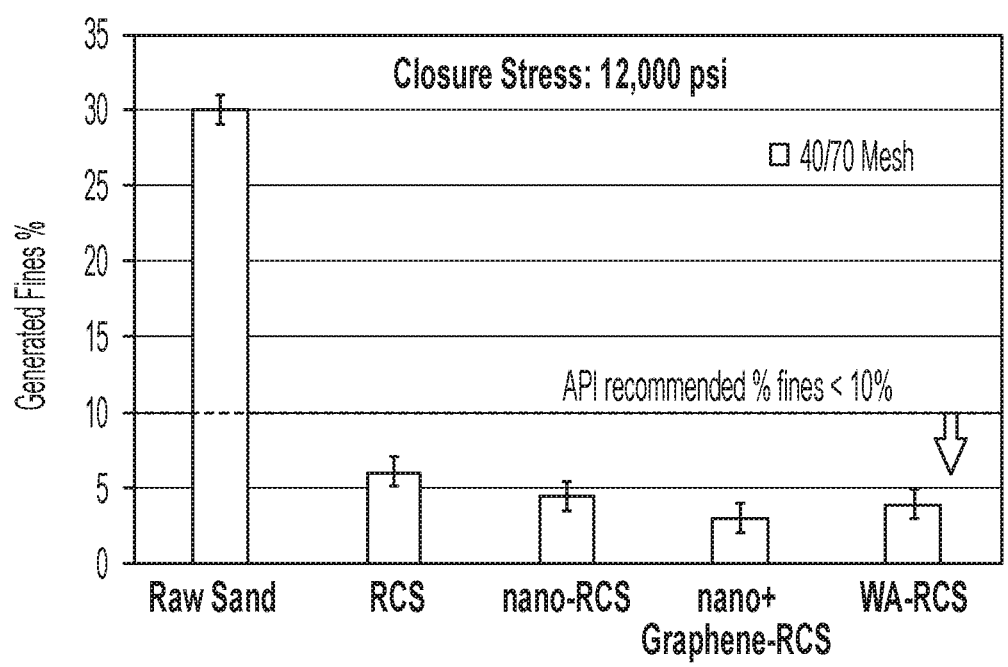
FIG. 14 graphically depicts the percent of fines generated under a closure stress of 12,000 psi, according to one or more embodiments described in this disclosure.
Figure 15:
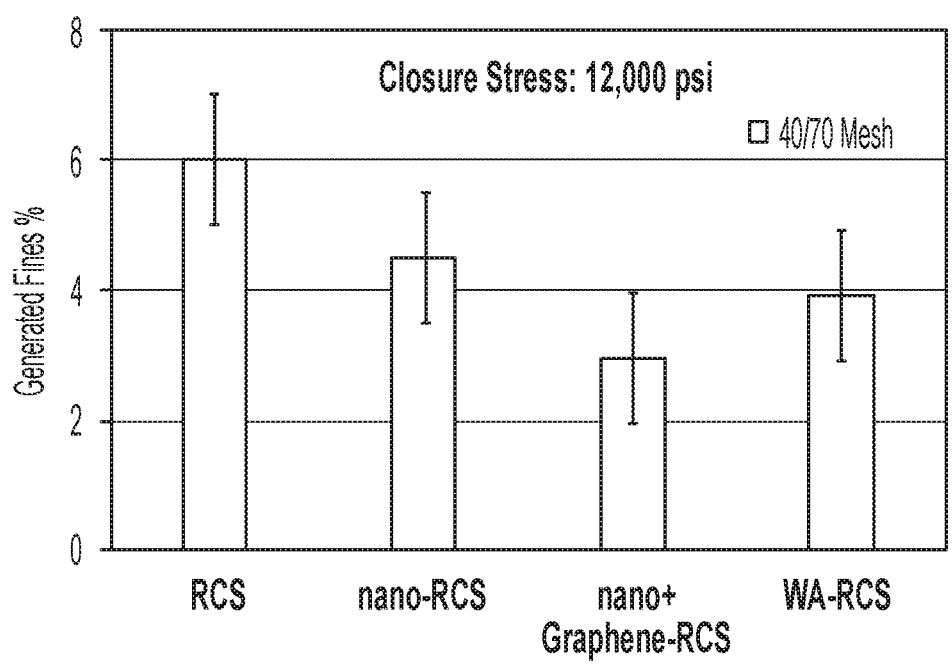
FIG. 15 graphically depicts the percent of fines generated under a closure stress of 12,000 psi, according to one or more embodiments described in this disclosure.

FIGS. 14 and 15 show the API crush resistance stress test conducted on 40/70 mesh uncoated raw sand, RCS, nano-RCS, RCS including carbon nanotubes and graphene (nano+Graphene-RCS), and wettability altered resin coated sand (WA-RCS), following ISO 13503-2:2006 protocol. The percentage fines generated corresponds to closure stress of 12,000 psi for each of the cases. As evident, the nano+ Graphene-RCS generated about 3% fines, which is less than the nano-RCS. This demonstrates the synergistic qualities of carbon nanotubes and graphene.

Example 9

Figure 16:
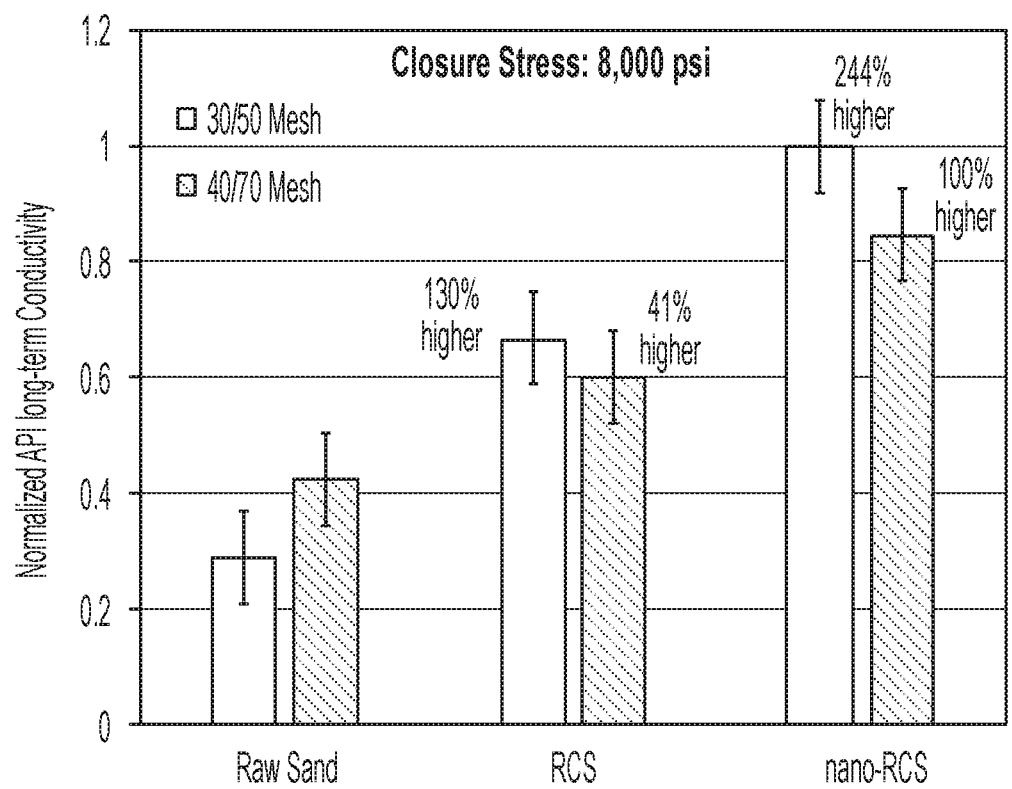
FIG. 16 graphically depicts normalized API long-term proppant conductivity data, according to one or more embodiments described in this disclosure.

API long-term conductivity testing was also performed on the proppant samples. FIG. 16 shows the normalized API long-term conductivity test results for 30/50 and 40/70 mesh uncoated raw sand, resin coated sand (RCS), and nano-reinforced resin coated sand (nano-RCS). All six cases of data were normalized with respect to the 30/50 mesh nano-RCS data. For 30/50 mesh sand, the measured conductivity of RCS and nano-RCS were 130% and 244% greater than raw sand, respectively. For 40/70 mesh sand, the measured conductivity of RCS and nano-RCS were 41% and 100% greater than raw sand, respectively. For raw sand, 40/70 mesh sand showed greater conductivity whereas for RCS and nano-RCS, 30/50 mesh sand showed greater conductivity.

Figure 17:
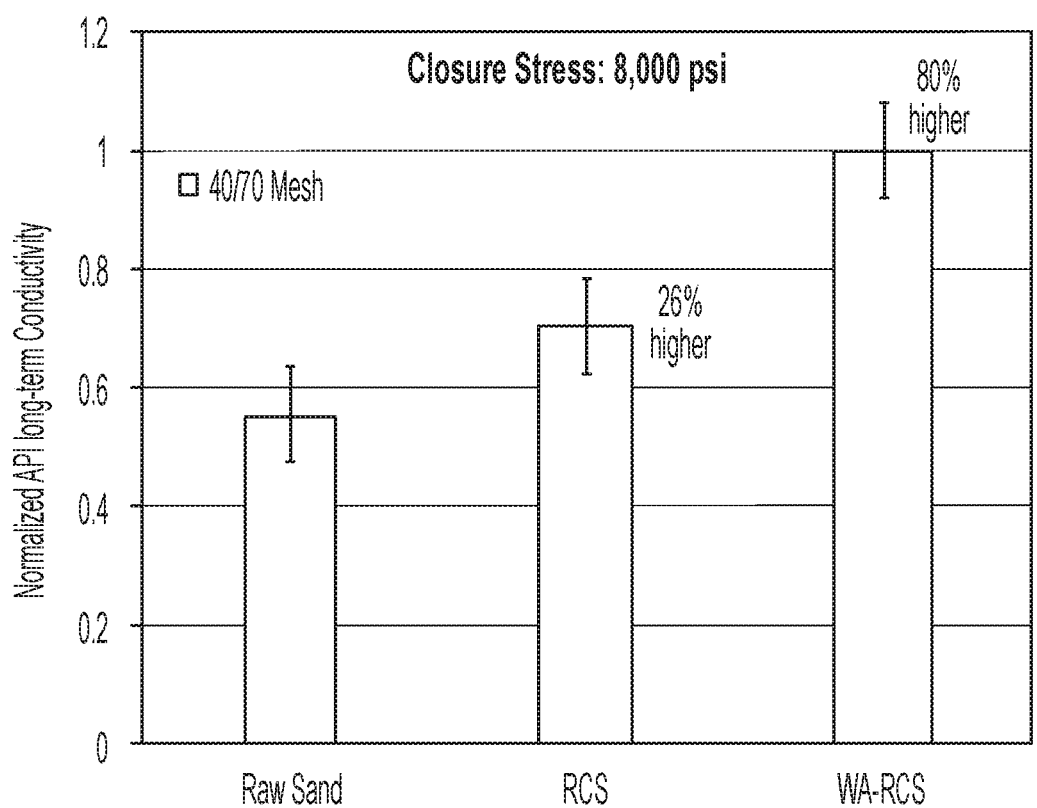
FIG. 17 graphically depicts normalized API long-term proppant conductivity data, according to one or more embodiments described in this disclosure.

In a similar way, the impact of surface wettability alteration of the resin coated sand was clearly captured in the API long-term conductivity test whereas API crush strength test was not able to detect any change in surface wetting property. This is because API conductivity test accommodates the option to study the effect of changes in surface wetting property as 2% KCl solution is pumped through the proppant pack. FIG. 17 shows the normalized API long-term conductivity test results for 40/70 mesh uncoated raw sand, resin coated sand (RCS), and resin coated sand with surface wettability altered (WA-RCS). For WA-RCS, Dynasylan® F 8815, produced by Evonik Industries was mixed to the coating after the cross-linking reaction was completed. All three cases of data were normalized with respect to the 40/70 mesh WA-RCS data. For 40/70 mesh sand, the measured conductivity of RCS and WA-RCS were 26% and 80% greater than raw sand, respectively.

Comparing FIG. 16 and FIG. 17, it is shown that 40/70 mesh RCS has 41% vs. 26% increase in long-term conductivity with respect to raw sand of the same mesh. The reported test results in FIG. 16 and FIG. 17 were conducted in two different testing laboratories under identical conditions. This difference of 15% between the two test cases falls within the expected percentage of error (typically ~20%) observed in the measurement of API long-term conductivity test as marked with the error bars in the respective plots.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

The presently described subject matter may include one or more aspects, which should not be regarded as limiting on the teachings of the present disclosure. A first aspect may include a method for producing proppants with a nanocomposite proppant coating, the method comprising: coating proppant particles with a nano-reinforcing agent, a surface modifier, and a resin to produce proppants with nanocomposite proppant coating.

A second aspect may include a proppant, comprising: a proppant particle; and a nanocomposite proppant coating comprising a nano-reinforcing agent, a surface modifier, and a resin, in which the nanocomposite proppant coating coats the proppant particle.

A third aspect may include a method for increasing a rate of hydrocarbon production from a subsurface formation, the method comprising: producing a first rate of production of hydrocarbons from the subsurface formation, in which the hydrocarbons comprise a first interfacial tension; introducing a hydraulic fracturing fluid comprising the proppants into the subsurface formation, in which the proppants reduce the first interfacial tension of the hydrocarbons to a second interfacial tension, thereby reducing condensate banking or water blockage near a wellbore; and increasing hydrocarbon production from the subsurface formation by producing a second rate of production of hydrocarbons from the subsurface formation, in which the second rate of production of hydrocarbons is greater than the first rate of production of hydrocarbons.

Another aspect includes any of the previous aspects, further comprising mixing the nano-reinforcing agent, surface modifier, and resin into a mixture; and coating the proppant particles with the mixture.

Another aspect includes any of the previous aspects, further comprising: coating the proppant particles with the resin; mixing the nano-reinforcing agent and the surface modifier to form a mixture; and coating the proppant particles with the mixture.

Another aspect includes any of the previous aspects, further comprising heating the proppant particles up to from 370° F. to 425° F. before coating the proppant particles with the resin.

Another aspect includes any of the previous aspects, further comprising coating the proppants with at least one of a coupling agent and a crosslinker.

Another aspect includes any of the previous aspects, in which the coupling agent comprises at least one of 3-glycidoxypropyltrimethoxysilane, 3-aminopropyltriethoxysilane, 3-aminopropyltrimethoxysilane, and 3-chloropropyltrimethoxysilane.

Another aspect includes any of the previous aspects, in which the coupling agent comprises from 0.5 to 5 vol. % 3-glycidoxypropyltrimethoxysilane and from 95 to 99.5 vol. % deionized water.

Another aspect includes any of the previous aspects, in which the crosslinker comprises at least one of hexamethylenetetramine, paraformaldehyde, oxazolidines, melamine resins, aldehyde donors, or resole polymers.

Another aspect includes any of the previous aspects, in which the proppants comprise from 0.5 to 2 wt. % nano-reinforcing agent as calculated by a weight of the resin.

Another aspect includes any of the previous aspects, in which the proppants further comprise from 10 to 18 wt. % crosslinker as calculated by a weight of the resin.

Another aspect includes any of the previous aspects, in which the proppants comprise 2 to 5 wt. % resin as calculated by a weight of the proppant particles.

Another aspect includes any of the previous aspects, in which the nanocomposite proppant coating comprises less than or equal to 0.5 wt. % of the nano-reinforcing agent.

Another aspect includes any of the previous aspects, in which the nanocomposite proppant coating comprises the nano-reinforcing agent, the surface modifier, and the resin uniformly distributed throughout.

Another aspect includes any of the previous aspects, in which the nanocomposite proppant coating comprises the nano-reinforcing agent and the surface modifier coated as a layer over the resin.

Another aspect includes any of the previous aspects, in which the resin comprises at least one of phenol, furan, epoxy, urethane, or phenol-formaldehyde.

Another aspect includes any of the previous aspects, in which the phenol-formaldehyde resin comprises novolac.

Another aspect includes any of the previous aspects, in which the nano-reinforcing agent comprises at least one of nano-silica, nano-alumina, nano-zinc oxide, carbon nanotubes, nano-calcium carbonate, mica, vanadium pentoxide, boron nitride nanotubes, or nano-zirconium oxide.

Another aspect includes any of the previous aspects, in which the carbon nanotubes comprise at least one of single-walled nanotubes, double-walled nanotubes, multi-walled carbon nanotubes, or narrow-walled nanotubes.

Another aspect includes any of the previous aspects, in which the multi-walled carbon nanotubes comprise a diameter of from 6 to 10 nm, a length of from 100 to 200 µm, a metal oxide percentage of 1.5 wt. % or less, a bulk density of from 0.05 to 0.1 g/cm$^3$, and a specific surface area of from 400 to 700 m$^2$/g.

Another aspect includes any of the previous aspects, in which the carbon nanotubes comprise a diameter of from 3 to 10 nm, a length of from 100 to 200 µm, an aspect ratio of 12,000 to 25,000, and a specific surface area of from 400 to 700 m$^2$/g.

Another aspect includes any of the previous aspects, in which the surface modifier comprises at least one of an alkyl fluorosilane solution, a fluorinated surfactant, a fluorinated polymer, and a fluorinated polymeric surfactant.

Another aspect includes any of the previous aspects, in which the surface modifier comprises triethoxy(tridecafluorooctyl)silane.

Another aspect includes any of the previous aspects, in which the proppant particles are particles of a material comprising at least one of oxides, silicates, sand, ceramic, resin, plastic, mineral, glass, graded sand, treated sand, resin-coated sand, other resin-coated particles, bauxite, sintered bauxite, glass particles, glass beads, and combinations of any of these.

Another aspect includes any of the previous aspects, in which the proppant particles comprise a diameter of from 300 µm to 600 µm.

Another aspect includes any of the previous aspects, in which the proppant is hydrophobic.

Another aspect includes any of the previous aspects, in which the proppant is oleophobic.

Another aspect includes any of the previous aspects, in which the proppant comprises a condensate contact angle of from between 50° and 60°.

Another aspect includes any of the previous aspects, in which the proppant comprises a water contact angle of at least 90°.

Having described the subject matter of the present disclosure in detail and by reference to specific embodiments of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method for producing proppants with a nanocomposite proppant coating, the method comprising:
   coating proppant particles with a surface modifier, a first resin, a coupling agent, a crosslinker, and a nano-reinforcing agent comprising both carbon nanotubes and graphene, to produce proppants with the nanocomposite proppant coating, wherein:
   the nanocomposite proppant coating comprises from 1 to 2 wt. % carbon nanotubes as calculated by weight of the first resin and from 1 to 2 wt. % graphene as calculated by weight of the first resin, in which the carbon nanotubes are connected to the graphene via sp2 covalent bonds, wherein:
     the nanocomposite proppant coating comprises from 2 to 3 wt. % carbon nanotubes and graphene combined as calculated by weight of the first resin;
   the surface modifier comprises an alkyl fluorosilane solution, a fluorinated surfactant, a fluorinated polymer, a fluorinated polymeric surfactant, or combinations of these;
   the coupling agent comprises at least one of 3-glycidoxypropyltrimethoxysilane, 3-aminopropyltriethoxysilane, 3-aminopropyltrimethoxysilane, and 3-chloropropyltrimethoxysilane;
   the crosslinker comprises at least one of hexamethylenetetramine, paraformaldehyde, oxazolidines, melamine resins, aldehyde donors, or resole polymers;
   the proppant comprises from 10 to 18 wt. % crosslinker as calculated by a weight of the first resin; and
   the proppant particle is a particle of a material comprising at least one of oxides, silicates, sand, ceramic, a second resin, plastic, mineral, glass, graded sand, treated sand, resin-coated sand, resin-coated particles, bauxite, sintered bauxite, glass particles, glass beads, and combinations of any of these.

2. The method of claim 1, further comprising mixing the nano-reinforcing agent, surface modifier, and the first resin into a mixture; and coating the proppant particles with the mixture.

3. The method of claim 1, further comprising:
   coating the proppant particles with the first resin;
   mixing the nano-reinforcing agent and the surface modifier to form a mixture; and
   coating the proppant particles with the mixture.

4. The method of claim 1, further comprising heating the proppant particles up to from 370° F. to 425° F. before coating the proppant particles with the first resin.

5. The method of claim 1, in which the proppants comprise 2 to 5 wt. % first resin as calculated by a weight of the proppant particles.

6. The method of claim 1, in which the first resin comprises phenol, epoxy, urethane, phenol-formaldehyde, or combinations of these.

7. The method of claim 1, in which the surface modifier comprises triethoxy(tridecafluorooctyl)silane.

8. A proppant, comprising:
   a proppant particle; and
   a nanocomposite proppant coating comprising a surface modifier, a first resin, a coupling agent, a crosslinker, and a nano-reinforcing agent comprising both carbon nanotubes and graphene, wherein:
   the nanocomposite proppant coating coats the proppant particle;
   the nanocomposite proppant coating comprises from 1 to 2 wt. % carbon nanotubes as calculated by weight of the first resin and from 1 to 2 wt. % graphene as calculated by weight of the first resin, in which the carbon nanotubes are connected to the graphene via sp2 covalent bonds, wherein:

the nanocomposite proppant coating comprises from 2 to 3 wt. % carbon nanotubes and graphene combined as calculated by weight of the first resin;

the surface modifier comprises an alkyl fluorosilane solution, a fluorinated surfactant, a fluorinated polymer, a fluorinated polymeric surfactant, or combinations of these;

the coupling agent comprises at least one of 3-glycidoxypropyltrimethoxysilane, 3-aminopropyltriethoxysilane, 3-aminopropyltrimethoxysilane, and 3-chloropropyltrimethoxysilane;

the crosslinker comprises at least one of hexamethylenetetramine, paraformaldehyde, oxazolidines, melamine resins, aldehyde donors, or resole polymers;

the proppant comprises from 10 to 18 wt. % crosslinker as calculated by a weight of the first resin; and the proppant particle is a particle of a material comprising at least one of oxides, silicates, sand, ceramic, a second resin, plastic, mineral, glass, graded sand, treated sand, resin-coated sand, resin-coated particles, bauxite, sintered bauxite, glass particles, glass beads, and combinations of any of these.

9. The proppant of claim 8, in which the proppant comprises a condensate contact angle of from between 50° and 60°.

10. The proppant of claim 8, in which the proppant comprises a water contact angle of at least 90°.

11. The proppant of claim 8, in which the nanocomposite proppant coating comprises the nano-reinforcing agent and the surface modifier coated as a layer over the first resin.

12. The proppant of claim 8, in which the proppant comprises:

from 2 to 5 wt. % first resin as calculated by a weight of the proppant particles.

13. The proppant of claim 8, in which:

the first resin comprises at least one of phenol, epoxy, urethane, or phenol-formaldehyde; and the surface modifier comprises triethoxy(tridecafluorooctyl)silane.

14. A method for increasing a rate of hydrocarbon production from a subsurface formation, the method comprising:

producing a first rate of production of hydrocarbons from the subsurface formation, in which the hydrocarbons comprise a first interfacial tension;

introducing a hydraulic fracturing fluid comprising the proppant of claim 8 into the subsurface formation, in which the proppant reduces the first interfacial tension of the hydrocarbons to a second interfacial tension, thereby reducing condensate banking or water blockage near a wellbore; and increasing hydrocarbon production from the subsurface formation by producing a second rate of production of hydrocarbons from the subsurface formation, in which the second rate of production of hydrocarbons is greater than the first rate of production of hydrocarbons.

15. The proppant of claim 8, in which the proppant has a measured fracture energy from 12 to 50 milliJoules per square meter.

* * * * *